United States Patent
Waltz et al.

(10) Patent No.: US 12,540,661 B2
(45) Date of Patent: *Feb. 3, 2026

(54) ELECTRIC AXLE

(71) Applicant: Dana Heavy Vehicle Systems Group, LLC, Maumee, OH (US)

(72) Inventors: William F. Waltz, Toledo, OH (US); Darren J. Ziskovsky, Bowling Green, OH (US)

(73) Assignee: DANA HEAVY VEHICLE SYSTEMS GROUP, LLC, Maumee, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/784,452

(22) Filed: Jul. 25, 2024

(65) Prior Publication Data
US 2025/0043855 A1 Feb. 6, 2025

Related U.S. Application Data

(60) Provisional application No. 63/515,760, filed on Jul. 26, 2023.

(51) Int. Cl.
*F16H 37/08* (2006.01)
*B60K 1/00* (2006.01)
(Continued)

(52) U.S. Cl.
CPC .............. *F16H 37/082* (2013.01); *B60K 1/02* (2013.01); *F16H 48/10* (2013.01);
(Continued)

(58) Field of Classification Search
CPC ...... F16H 37/08–0826; F16H 2200/202–2028; F16H 3/66–666;
(Continued)

(56) References Cited

U.S. PATENT DOCUMENTS

| | | | | |
|---|---|---|---|---|
| 6,015,361 A | * | 1/2000 | Yamazaki | F16H 48/11 192/69.82 |
| 7,211,019 B2 | * | 5/2007 | Kirkwood | B60K 17/35 475/205 |
| 7,819,212 B2 | * | 10/2010 | Kawasaki | B60W 10/107 477/3 |
| 9,816,594 B2 | * | 11/2017 | Hart | F16H 37/022 |

(Continued)

FOREIGN PATENT DOCUMENTS

| CN | 215552537 U | * | 1/2022 | |
|---|---|---|---|---|
| DE | 102020211372 A1 | * | 3/2022 | B60K 17/08 |

OTHER PUBLICATIONS

Waltz, W. et al., "All Wheel Drive Electric Transmission," U.S. Appl. No. 18/784,472, filed Jul. 25, 2024, 33 pages.

(Continued)

*Primary Examiner* — James J Taylor, II
(74) *Attorney, Agent, or Firm* — McCoy Russell LLP

(57) ABSTRACT

Methods and systems are provided for an electric axle. The electric axle system includes, in one example, an electric machine, a multi-speed transmission that is rotationally coupled to the electric machine, rotationally coupled to two output shafts, and including a Ravigneaux gear set rotationally coupled and positioned coaxial to a differential. The electric axle system further includes a mode clutch configured to selectively ground a carrier or a ring gear in the Ravigneaux gear set, ground a sun gear in the Ravigneaux gear set, and couple the carrier or the ring gear to the sun gear in the Ravigneaux gear set.

18 Claims, 11 Drawing Sheets

(51) Int. Cl.
  *B60K 1/02* (2006.01)
  *F16H 48/08* (2006.01)
  *F16H 48/10* (2012.01)
  *F16H 48/11* (2012.01)
  *F16H 48/24* (2006.01)

(52) U.S. Cl.
  CPC ........ *B60K 2001/001* (2013.01); *F16H 48/08* (2013.01); *F16H 2048/106* (2013.01); *F16H 48/11* (2013.01); *F16H 48/24* (2013.01); *F16H 2200/2005* (2013.01); *F16H 2200/2007* (2013.01); *F16H 2200/2023* (2013.01); *F16H 2200/2033* (2013.01); *F16H 2200/2064* (2013.01)

(58) Field of Classification Search
  CPC ..... F16H 2200/2094; F16H 2200/2064; F16H 2200/2033; B60K 17/16–165; B60K 17/20
  See application file for complete search history.

(56) References Cited

U.S. PATENT DOCUMENTS

| | | | |
|---|---|---|---|
| 9,944,166 B2* | 4/2018 | Janson | B60K 6/48 |
| 10,400,877 B2* | 9/2019 | Pinschmidt | B60K 6/48 |
| 11,110,789 B2* | 9/2021 | Pinschmidt | F16H 48/36 |
| 11,828,352 B1* | 11/2023 | Maurel | F16H 3/666 |
| 2023/0313871 A1* | 10/2023 | Ziemer | F16H 3/66 |
| | | | 180/243 |
| 2025/0033465 A1* | 1/2025 | Waltz | B60K 17/35 |
| 2025/0035196 A1* | 1/2025 | Waltz | F16H 37/08 |
| 2025/0035198 A1* | 1/2025 | Waltz | F16H 48/11 |

OTHER PUBLICATIONS

Waltz, W. et al., "Electric Axle," U.S. Appl. No. 18/784,584, filed Jul. 25, 2024, 37 pages.

Waltz, W. et al., "Electric Axle," U.S. Appl. No. 18/784,614, filed Jul. 25, 2024, 37 pages.

* cited by examiner

ELECTRIC AXLE

CROSS-REFERENCE TO RELATED APPLICATION

The present application claims priority to U.S. Provisional Application No. 63/515,760, entitled "ELECTRIC AXLE", and filed on Jul. 26, 2023. The entire contents of the above-listed application are hereby incorporated by reference for all purposes.

TECHNICAL FIELD

The present description relates generally to an electric axle with two concentric planetary gear sets.

BACKGROUND AND SUMMARY

Electric axles have been used in a variety of vehicle platforms to fulfill the electrification needs of different vehicle sectors. These electric axles include traction motors and transmissions which may be mounted in different arrangements depending on the spatial constraints and end-use goals of the vehicle platform. Electric axles may be more capable of simplified and efficient vehicle platform integration when compared to electric drives with the traction motor, transmission, and drive axles designed as separate units.

At least some electric axles have fallen short of achieving end-use design goals in relation to space efficiency, shifting functionality, and power density. For instance, some multi-speed transmissions use a multitude of parallel shafts and gears that create packaging challenges. Further, in previous multi-speed transmissions, all of the gearing is meshed but in certain modes torque is only transmitted through a portion of the gears, leaving other gears unloaded. Therefore, the unloaded gears create unavoidable bearing, mesh, and windage losses. The inventors have therefore recognized a desire to reduce the packaging space and increase the power density of electric axles.

The issues described above may be addressed by an electric axle system. The electric axle system includes, in one example, an electric machine and a multi-speed transmission that is rotationally coupled to the electric machine and rotationally coupled to two output shafts. The multi-speed transmission includes a Ravigneaux gear set that is rotationally coupled and positioned coaxial to a differential. The multi-speed transmission further includes a mode clutch configured to selectively transition the multi-speed transmission between a first mode, a second mode and a third mode. In this way, the Ravigneaux gear set effectively achieves three gear ratio modes in a space efficient package, expanding the system's speed change capabilities.

In one example, the differential is a differential meshed planet compound planetary gear set. In this way, a space efficient electric axle with a desired power density is achieved. To elaborate, the use of the differential meshed planet compound planetary gear set and the Ravigneaux gear set in this configuration allows the electric axle to forgo the use of additional shafts (e.g., layshafts with idling gears), if desired, while achieving a desired number of gear modes and ratios of the modes. Consequently, customer appeal is increased.

In one example, the electric axle system further includes a differential locking clutch that is configured to selectively rotationally couple a second ring gear in the differential to a carrier in the differential to lock rotation of the two output shafts. Further in one example, the electric axle additionally includes an axle disconnect clutch that is configured to selectively disconnect the Ravigneaux gear set from the differential. In this way, the electric axle's functionality is expanded to exhibit differential locking and axle disconnect capabilities, further increasing customer appeal.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1A:
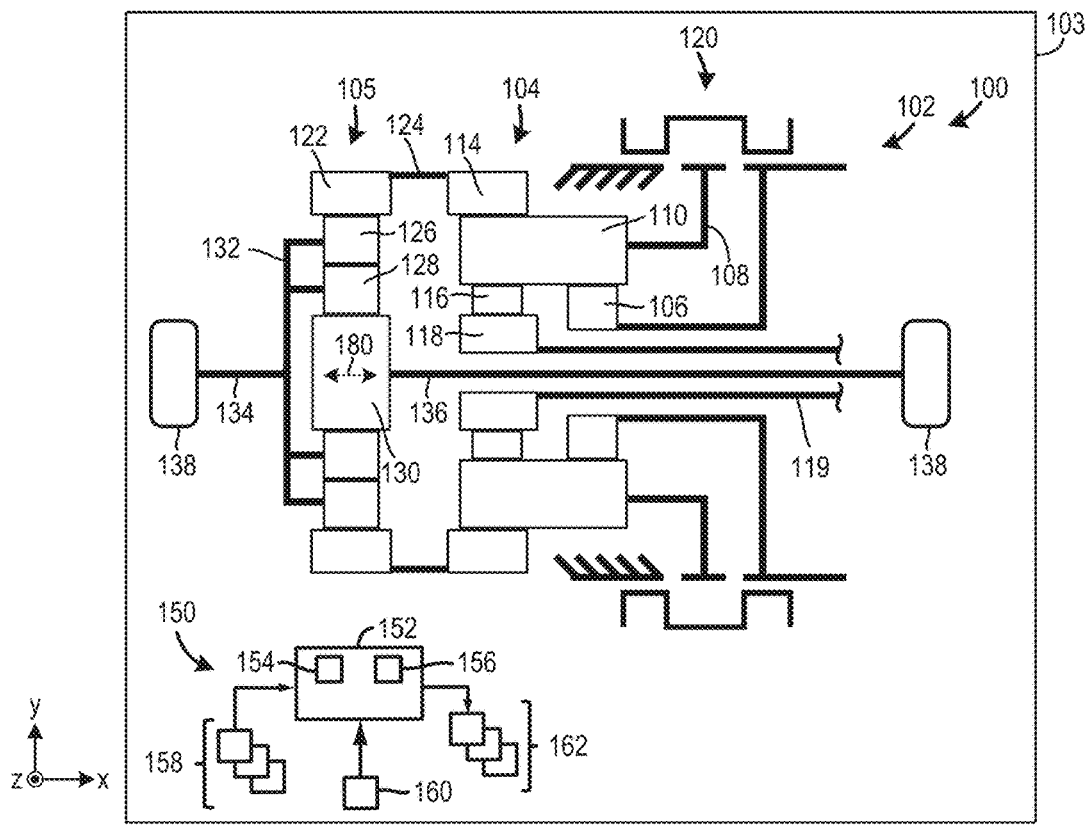
FIGS. 1A-1B show an example of an electric axle with a differential meshed planet compound planetary gear set, a Ravigneaux gear set which comprises two sets of planetary gears where one is a simple planetary gear, and a mode clutch.

A differentiating multi-speed electric axle with mode select functionality that achieves increased compactness and power density is described herein. Previous multi-speed electric axles have made use of multiple parallel shafts that present packaging challenges. For instance, some multi-speed electric axles use two shafts dedicated to gear shifting, at a minimum. In these electric axles all of the gearing is meshed but in certain modes torque is only transmitted through a portion of the gears, leaving other gears unloaded. Therefore, the unloaded gears create unavoidable bearing, mesh, and windage losses. Further, differentials which employ spider gears are comparatively wide and may present axial packaging challenges in certain vehicles, thereby constraining the differential's applicability. Certain planetary differentials such as compound planetary differentials with two output sun gears or two output ring gears, two concentric simple planetary gear sets side by side, and two nested concentric planetary gear sets may also present challenges with regard to axial length and/or overall diameter of the drive axle. However, the aforementioned types of planetary gear sets may be used in any of the electric axles described herein.

As described herein a simple planetary gear set is a planetary gear set with solely a ring gear, a sun gear, a carrier, and multiple planet gears that are in the same plane as the ring gear and the sun gear and rotate on the carrier. Each planet gear meshingly engages both the sun gear and the ring gear. Further, as described herein a meshed planet compound planetary gear set is a planetary gear set with a ring gear, a sun gear, and multiple sets of planet gears in mesh in the plane of the ring gear and sun gear and circumferentially aligned in the same plane as the ring and the sun gears. The planet sets include an inner planet gear and an outer planet gear. The inner planet gear is meshingly engaged with the sun gear and an outer planet gear. The outer planet gear is meshingly engaged with an inner planet gear and the ring gear.

To achieve the space efficiency and power density targets, the electric axle includes, in one example, a transmission that has a multi-speed mode selection planetary gear set and a compact planetary differential in a coaxial package. To elaborate, the multi-speed gear set in the transmission includes a Ravigneaux gear set with a mode clutch for shifting between the gear modes. Further, in the transmission, the differential planetary gear set is a meshed planet compound planetary gear set.

In one example, the electric axle includes differential and multi-speed planetary gear sets that are concentric with the electric axle's output axis. Further, the differential in the electric axle may be formed of a compound planetary gear set with meshed planet gears. The use of the mode and differential planetary gear sets allows multiple shafts used for gear shifting to be omitted from the system, if desired. Consequently, packaging efficiency is increased, the width of the differential is reduced, and the overall axial length of the electric axle is reduced, if desired, thereby allowing a more compact and power dense electric axle architecture to be achieved. Unlike previous multi-speed electric axles with idling gears on layshafts, all the gears in the multi-speed electric axle may transmit torque. To elaborate, there may be no idling gear passes in the system that create bearing, mesh, and windage losses while in an adjacent speed mode. Consequently, transmission efficiency is increased.

When the differentiating multi-speed (e.g., three speed) electric axle is in one of the two lower modes (e.g., a first mode or a second mode), there is relative speed between the elements of the mode planetary gear set. In the third mode, the mode planetary gear set may be locked up and rotate as one. The differential planetary gear set may also rotate as one and differentiates solely when the vehicle is turning. In practice, the transmission may likely be operated in the highest mode to a greater extent of its operational life than the other modes (e.g., the majority of the time). In the highest mode the planetary gear sets rotate as one. With no relative component rotation within the differential planetary gear set and no relative component rotation within the multi-speed planetary gear set, gear mesh noise will decrease, gear tooth wear will decrease, component lifespan will increase, frictional losses will decrease, and windage losses will decrease, thereby increasing the axle's overall efficiency. With increased life and a multiple array of planet gear pairs, there is the opportunity to decrease the width of the differential planetary gear set and mode planetary gear set, thereby reducing the electric axle's axial length, if desired. Also, in certain end-use operational scenarios, the electric axle may be operated in the highest mode for a longer duration than the other modes and with no relative speed with the meshed planet pairs, there may be the opportunity to use spur gears in the planetary gear sets, further reducing the electric axle's cost and complexity as well as simplifying component manufacturing of the differential planetary gear set and the multi-speed mode planetary gear set.

The layouts of the differentiating multi-speed electric axle described herein allow for an axle disconnect, and differential lock features to be easily and effectively incorporated into the axle, if desired. Consequently, the electric axles are able to achieve added features that may be difficult to package on other axle architectures such as a parallel axis differential design. Further, it will be appreciated that the electric axles described herein may be designed with the electric motor arranged concentric to the output axis, coaxial to the output axis, parallel to the output axis, at 90° to the output axis, or at other suitable angles with regard to the output axis.

FIG. 1A shows an example of an electric axle 100 with a transmission 102 that includes a mode planetary gear set 104. The electric axle 100 further includes a differential meshed planet compound planetary gear set 105, in the illustrated example. The mode planetary gear set 104 and the differential meshed planet compound planetary gear set 105 are discussed in greater detail herein.

The electric axle 100 is included in an electric vehicle (EV) 103, in the illustrated example. It will be understood that the other electric axles described herein may also be included in a similar EV. The EV 103 may be an all-electric vehicle (e.g., battery electric vehicle (BEV)), in one example, or a hybrid electric vehicle, in another example. As such, vehicles that utilize the electric axles described herein may also have an internal combustion engine (e.g., a spark ignition engine, a compression ignition engine, combinations thereof, and the like), in some examples. Thus, the electric axles described herein may be used in cars, trucks, all-terrain vehicles (ATVs), commercial vehicles, light vehicles, off-highway vehicles, mining vehicles, rail vehicles, manufacturing machinery, industrial machinery, and the like.

Further, the mode planetary gear set 104 is a Ravigneaux gear set, in the illustrated example. To expound, the Ravigneaux gear set 104 comprises two sets of planetary gears where one set is a simple planetary gear set and the other set is a meshed planet compound planetary gear set in the illustrated example. However, the Ravigneaux gear set may have a greater number of planetary gear sets, in other examples. Specifically, in the illustrated example, the mode planetary gear set 104 includes a first sun gear 106 and a carrier 108 with a set of planet gears 110 rotatably mounted thereon.

In the illustrated example, the sun gear 106 meshes with the planetary gears in the set of planet gears 110. The mode planetary gear set 104 further includes a ring gear 114, a set of planet gears 116, and a second sun gear 118, in the illustrated example. Further, in the illustrated example, the ring gear 114 meshes with the planetary gears in the set of planet gears 110. Even further in the illustrated example, the planetary gears in the second set of planet gears 116 mesh with the second sun gear 118 as well as the gears in the set of planet gears 110. An input shaft 119 is rotationally coupled to the sun gear 118, in the illustrated example. Various architectures for providing rotational input to the mode planetary gear set are expanded upon herein. The set of planet gears 110 and the set of planet gears 116 are rotatably mounted to the carrier 108.

The mode planetary gear set 104 may be specifically configured to shift between three modes. However, electric axles with a greater number of speeds, such as a four speed electric axle, a five speed electric axle, etc., have been contemplated. To enable the multi-speed functionality of the transmission, a mode clutch 120 is provided in the transmission. The mode clutch 120 is configured to ground the carrier 108 in a first mode, ground the first sun gear 106 in a second mode, and rotationally couple the carrier 108 and the first sun gear 106 in a third mode. The mode clutch 120 is in the second mode in the illustrated example. However, the mode clutch 120 may be switched into the different modes based on operating conditions of the electric axle and/or vehicle. Further, the first mode has a higher gear ratio than the second mode, and the second mode has a higher gear ratio than the third mode. The specific gear ratios associated with the modes may be selected based on factors such as electric motor type and performance characteristics, vehicle weight, vehicle performance targets, and the like.

The mode clutch 120 may be a dog clutch, a synchronizer, a friction clutch (e.g., a wet friction clutch), a radial clutch, a face clutch, a curvic clutch, a magnetic clutch, combinations thereof, and the like. The other clutches described herein may also be any of the aforementioned types or combinations of clutch types. Further, the mode clutch 120 as well as the other clutches described herein may be actuated via electro-mechanic actuators, pneumatic actuators, hydraulic actuators, electro-magnetic actuators, barrel cam actuators, combinations thereof, and the like. Shift forks, such as translational or rotational shift forks, may specifically be used to actuate at least a portion of the clutches described herein.

The differential meshed planet compound planetary gear set 105 is rotationally coupled to mode planetary gear set 104. To expound, the ring gear 114 in the mode planetary gear set 104 is coupled to a ring gear 122 in the differential meshed planet compound planetary gear set 105 via a shaft 124 and/or other suitable mechanical component. Attaching the differential meshed planet compound planetary gear set and the mode planetary gear set in this manner allows the transmission to achieve a compact arrangement and a desired gear ratio.

The differential meshed planet compound planetary gear set 105 further includes a set of planet gears 126, a set of planet gears 128, and a sun gear 130. A carrier 132 is further included in the differential meshed planet compound planetary gear set 105 that has the set of planet gears 126 and the set of planet gears 128 rotatably mounted thereto. In the illustrated example, an output shaft 134 (e.g., an axle shaft such as a half shaft) is coupled to the carrier 132 and another output shaft 136 is coupled to the sun gear 130. In turn, the output shafts 134 and 136 are rotationally coupled to drive wheels 138, in the illustrated example. However, in other examples, the axle shafts 134 and 136 may be coupled to wheel end gear reductions and/or other suitable mechanical components.

In the electric axle 100 depicted in FIG. 1A, the carrier 132 and the sun gear 130 of the differential meshed planet compound planetary gear set 105 function as the differential's outputs and the sun gear 118 of the Ravigneaux gear set functions as the electric axle's input. However, differentials with different output configurations may be used in the electric axle, as discussed in greater detail herein with regard to FIGS. 8, 10, and 11.

The mode planetary gear set 104 and the differential meshed planet compound planetary gear set 105 are concentric with the electric axle's output rotational axis, in the illustrated example. In this way, the axle's compactness is increased when compared to axles with non-concentric arrangement. A rotational axis 180 of the differential meshed planet compound planetary gear set 105, is provided in FIG. 1A, for reference. It will be understood, that the rotational axis of the input of the mode planetary gear set 104 and the rotational axes of the axle shafts 134 and 136 are arranged coaxial to the rotational axis 180.

The use of the mode planetary gear set 104 and the differential meshed planet compound planetary gear set 105 may allow additional shafts and shifting gears to be omitted from the transmission (if desired), reduces packaging, decreases transmission width, and reduces the overall axial length allowing for a more compact and power dense electric axle design, if desired. In this way, transmission efficiency is increased.

As discussed above, when the mode planetary gear set 104 is operated in one of the two lower modes (i.e., the first mode or the second mode), there is relative speed between the elements of the multi-speed mode planetary gear set. In the third mode, the mode planetary gear set is locked up and rotates as one. The differential may also typically rotate as one and solely differentiates while the vehicle is turning. The majority of the electric axle's life may be in the highest mode, in certain end-use platforms, thereby decreasing component wear, decreasing windage losses, and increasing electric axle efficiency.

A coordinate axis system is provided in FIG. 1A, as well as FIGS. 2A and 3A-11, for reference and to orient the views, when appropriate. The z-axis may be a vertical axis (e.g., parallel to a gravitational axis), the x-axis may be a lateral axis (e.g., horizontal axis), and the y-axis may be a longitudinal axis, in one example. However, in other examples, the axes may have other orientations. A rotational axis 180 of the sun gear 130 is further provided for reference in FIG. 1A, as previously indicated. The mode planetary gear set 104 and the differential meshed planet compound planetary gear set 105 are coaxially arranged, in the illustrated example. The other electric transmissions described herein also exhibit the coaxial arrangement between the mode planetary gear set and the differential. In this way, the electric transmission is able to achieve a desired space efficiency.

As shown in FIG. 1A, the EV 103 may further include a control system 150 with a controller 152. The controller 152 may include a microcomputer with components such as a processor 154 (e.g., a microprocessor unit), input/output ports, an electronic storage medium 156 for executable programs and calibration values, e.g., a read-only memory chip, random access memory, keep alive memory, a data bus, and the like. The storage medium may be programmed with computer readable data representing instructions which are executable by a processor for performing the methods, control techniques, and the like described herein as well as other variants that are anticipated but not specifically listed. Therefore, the electronic storage medium 156 may hold instructions stored therein that when executed by the processor 154 cause the controller 152 to perform the various method steps described herein.

The controller 152 may receive various signals from sensors 158 coupled to different regions of the EV 103 and specifically the electric axle 100. For example, the sensors 158 may include one or more motor speed sensors (elaborated upon below), shaft/gear speed sensors, thermocouples, pressure sensors, a pedal position sensor to detect a depression of an operator-actuated pedal (e.g., an accelerator pedal and/or a brake pedal), speed sensors at the vehicle wheels, and the like. An input device 160 (e.g., accelerator pedal, brake pedal, gear selector, combinations thereof, and the like) may further provide input signals indicative of an operator's intent for vehicle control.

Upon receiving the signals from the various sensors 158 of FIG. 1A, the controller 152 processes the received signals, and employs various actuators 162 of vehicle components to adjust the components based on the received signals and instructions stored on the memory of controller 152. For example, the controller 152 may receive an accelerator pedal signal indicative of an operator request for a vehicle acceleration adjustment. In response, the controller 152 may command operation of inverters which are electrically coupled to an electric machine which provides power to the mode planetary gear set to increase the power delivered from the motor to the transmission 102. The other controllable components in the vehicle may function in a similar manner with regard to sensor signals, control commands, and actuator adjustment, for example. Further, the control system 150 may be used in any of the electric axle systems and transmissions described herein.

The controller 152 may include instructions that when executed cause the mode clutch 120 to shift between the first mode, the second mode, and the third mode based on vehicle and axle operating conditions. For instance, the electric axle 100 may be operated in the first mode when the vehicle is traveling at lower vehicle speeds. When, the vehicle speed surpasses a first threshold, the mode clutch may shift to the second mode and when the vehicle speed surpasses a second threshold, the clutch may shift from the second mode to the third mode. This shifting sequence may also be implemented in the reverse order through the modes. Further, the shifting sequence may not occur sequentially and therefore may skip modes, if desired. For example, the electric axle may be commanded to start in the second mode or may downshift from the third mode to the first mode. The control system 150 described above may be used in any of the electric axles and transmissions described herein.

Figure 1B:
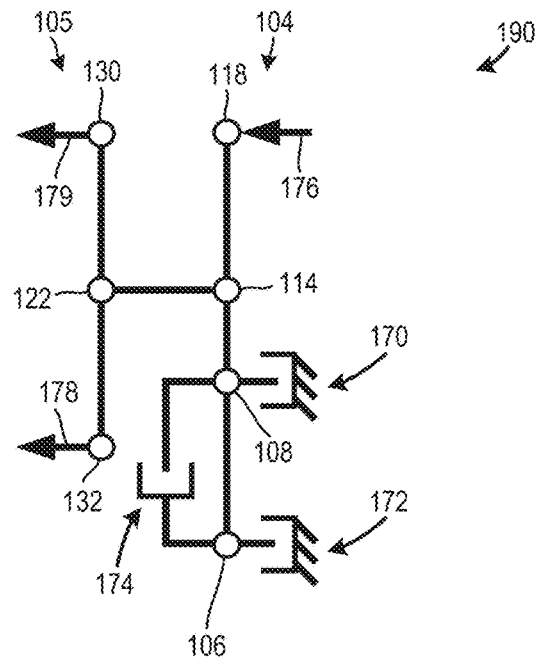

FIG. 1B shows a lever diagram 190 of the architecture of the electric axle 100, depicted in FIG. 1A. The three functions of the mode clutch 120, shown in FIG. 1A, which correspond to the first mode, the second mode, and the third mode are indicated via devices 170, 172, and 174, respectively. However, it will be appreciated that the mode clutch 120 may be configured to perform the mode switching functionality as one clutch unit. As discussed above, in the first mode, the carrier 108 is grounded, in the second mode the sun gear 106 is grounded, and in the third mode the carrier 108 and the sun gear 106 are rotationally coupled to one another. The input of the mode planetary gear set 104 is indicated via arrows 176 and the outputs of the differential meshed planet compound planetary gear set 105 are indicated via arrows 178 and 179. The rotational direction of the transmission's input is the same as the rotational directions of the transmission's outputs, in the illustrated example. However, other transmission designs are possible.

The equations provided below correspond to the transmission architecture depicted in FIGS. 1A-1B. However, it will be appreciated that the transmission architecture may be modified to exhibit other speed relationships between the components without departing from the present disclosure.

Where: $\omega_S$=Rotational speed of the specified sun gear
$\omega_C$=Rotational speed of the specified carrier
$\omega_R$=Rotational speed of the specified ring gear
C2=Carrier (132)
R2=Ring gear (122)
S2=Sun gear (130)
R4=R5=Ring gear (114)
P4-5=Planet gear set (110)
P5=Planet gear set (116)
S5=Sun gear (118)
S4=Sun gear (106)
C4=C5=Carrier (108)
$e_2$=Ring gear to sun gear ratio R2/S2
$e_4$=Ring gear to sun gear ratio R5/S4
$e_5$=Ring gear to sun gear ratio R5/S5

Differential Meshed Planet Compound Planetary Gear Set Speed Relationships ($\omega$)

$$\omega_{C2}(1 - e_2) = \omega_{S2} - \omega_{R2}e_2 \quad \text{(Eq. 1)}$$

For a 1:1 differential let $\omega_{c2} = -\omega_{s2}$ when $\omega_{R2}=0$.

$$1 - e_2 = \frac{\omega_{S2}}{\omega_{C2}} = -\frac{\omega_{S2}}{\omega_{S2}}$$

$$e_2 = 2$$

Ravigneaux Gear Set (104) Three-Speed Relationships ($\omega$)

$$\omega_{C4}(1 + e_4) = \omega_{S4} + \omega_{R4}e_4 \quad \text{(Eq. 2)}$$

$$\omega_{C5}(1 - e_5) = \omega_{S5} - \omega_{R5}e_5 \quad \text{(Eq. 3)}$$

(Combine eqs. 2&3)

Since: $\omega_{C4} - \omega_{C5}$

And: $\omega_{R4} = \omega_{R5}$ $$\omega_{R5}(e_4 + e_5) = \omega_{S5}(1 + e_4) - \omega_{S4}(1 - e_5) \quad \text{(Eq. 4)}$$

Mode 1 carrier$_{4-5}$ grounded, $\omega_{C5} = 0$ (From eq. 3)

$$\omega_{R5} = \frac{\omega_{S5}}{e_5}$$

Mode 2 sun$_4$ grounded, $\omega_{S4} = 0$ (From eq. 4)

$$\omega_{R5} = \omega_{S5} \frac{(1 + e_4)}{(e_4 + e_5)}$$

Mode 3 sun$_4$ locked to carrier$_{4-5}$, $\omega_{S4} = \omega_{C5}$ (From eq. 2) Locked planetary $$\omega_{C5} = \omega_{S4} = \omega_{R4} = \omega_{R5}$$

(From eq. 3) Locked planetary $$\omega_{C5} = \omega_{R5} = \omega_{S5}$$

Figure 2A:
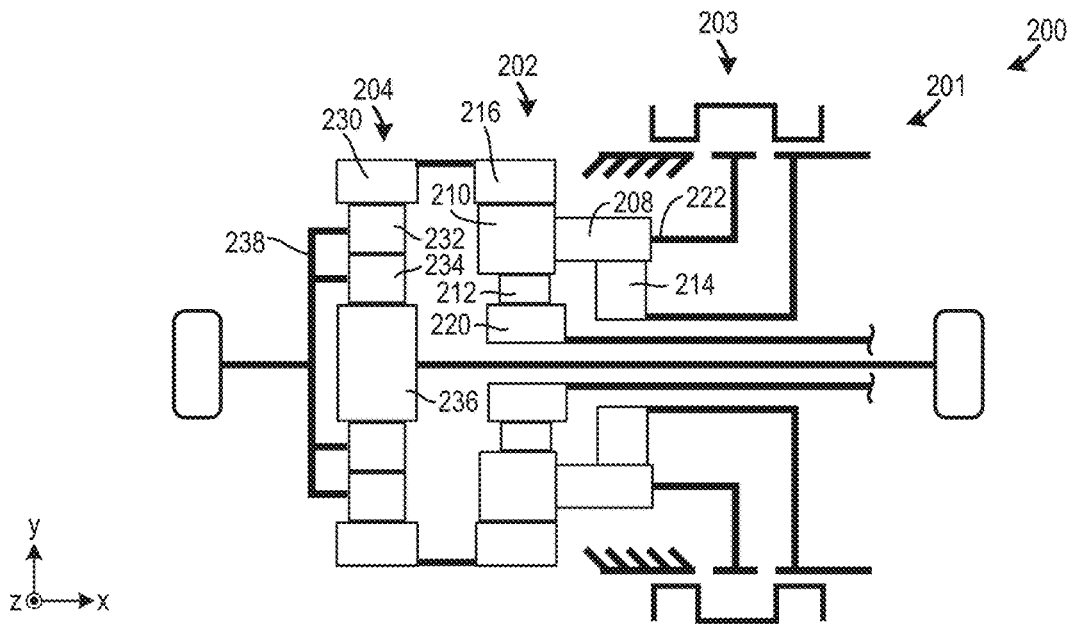
FIGS. 2A-2B show an example of an electric axle with a differential meshed planet compound planetary gear set, a Ravigneaux gear set with two sets of planet gears where one is a stepped planet, and a mode clutch.

FIG. 2A shows an example of an electric axle 200 with a transmission 201 that again includes a mode planetary gear set 202, a mode clutch 203, and a differential meshed planet compound planetary gear set 204. The differential meshed planet compound planetary gear set 204 again includes a ring gear 230, a set of planet gears 232, a set of planet gears 234, a sun gear 236, and a carrier 238, where the sets of planet gears 232 and 234 are rotatably mounted to the carrier 108.

The differential meshed planet compound planetary gear set 204 depicted in FIG. 2A and the differential meshed planet compound planetary gear set 105 depicted in FIG. 1A have a similar design. Further, the mode clutch 203 depicted in FIG. 2A and the mode clutch 120 shown in FIG. 1A have a similar design. Therefore, redundant description of the structural and functional features of these components is omitted for concision.

The mode planetary gear set 202 is again depicted as a Ravigneaux gear set that is configured to shift between three modes using the mode clutch 203. However, electric axles with a greater number of speeds such as a four speed electric axle have been contemplated. Further, the Ravigneaux planetary gear set 202 has a set of planet gears 208 that are coupled to a set of planet gears 210, and yet another set of planet gears 212. The sets of planet gears 208 and 210 are arranged as a stepped planet assembly. Thus, the gears in the set of planet gears 208 mesh with a sun gear 214 and the gears in the set of planet gears 210 mesh with a ring gear 216. The mode planetary gear set 202 further includes a set of planet gears 212 and another sun gear 220, similar to the mode planetary gear set 104, shown in FIG. 1A. The gears in the set of planet gears 212 mesh with a sun gear 220 and mesh with a set of planet gears 210. The sets of planet gears 208 and 210 forming the stepped planet gear arrangement and the set of planet gears 212 are rotationally coupled to a carrier 222 which is able to be grounded by the clutch 203. However, the Ravigneaux gear set may have another number of planet gear sets, in other examples.

Figure 2B:
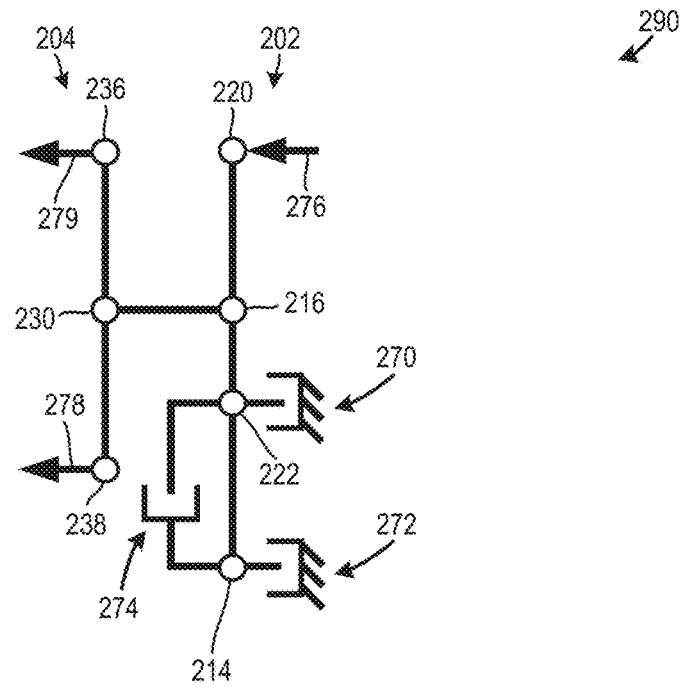

FIG. 2B shows a lever diagram 290 of the electric axle architecture, depicted in FIG. 2A. The three functions of the mode clutch 203, shown in FIG. 2A, which correspond to the first mode, the second mode, and the third mode are indicated via devices 270, 272, and 274, respectively. However, it will be appreciated that the mode clutch 203 may be configured to perform the mode switching functionality as one clutch unit. As discussed above, in the first mode, the carrier 222 is grounded, in the second mode the sun gear 214 is grounded, and in the third mode the carrier 222 and the sun gear 214 are rotationally coupled to one another. The input of the mode planetary gear set 202 is indicated via arrows 276 and the outputs of the differential meshed planet compound planetary gear set 204 are indicated via arrows 278 and 279. The rotational direction of the transmission's input is the same as the rotational directions of the transmission's outputs, in the illustrated example. However, other transmission designs are possible.

The equations provided below correspond to the transmission architecture depicted in FIGS. 2A-2B. However, it will be appreciated that the transmission architecture may be modified to exhibit other speed relationships between the components without departing from the present disclosure. Where: $\omega_S$=Rotational speed of the specified sun gear $\omega_C$=Rotational speed of the specified carrier
$\omega_R$=Rotational speed of the specified ring gear
C2=Carrier (238)
R2=Ring gear (230)
S2=Sun gear (236)
R4=R5=Ring gear (216)
P5a=Planet gear set (212)
P5b=Planet gear set (210)
P4=Planet gear set (208)
S5=Sun gear (220)
S4=Sun gear (214)
C4-C5=Carrier (222)
$e_2$=Ring gear to sun gear ratio R2/S2
$e_4$=Ring gear to sun gear ratio R5/S4
$e_5$=Ring gear to sun gear ratio R5/S5
N=Number of gear teeth Differential Meshed Planet Compound Planetary Gear Set Speed Relationships ($\omega$)

(Ref. Eq. 1)

$$\omega_{C2}(1-e_2) = \omega_{S2} - \omega_{R2}e_2$$

For a 1:1 differential let $\omega_{C2} = -\omega_{S2}$ when $\omega_{R2} = 0$ $$1 - e_2 = \frac{\omega_{S2}}{\omega_{C2}} = -\frac{\omega_{S2}}{\omega_{S2}}$$

$$e_2 = 2$$

Ravigneaus gear set (202) three-speed relationships ($\omega$)

$$e_5 = \frac{N_{R5}}{N_{S5}} \quad (\text{Eq. 5})$$

(Combine eqs. 3&5)

$$\omega_{C5} = \omega_{S5}\left(\frac{N_{S5}}{N_{S5}-N_{R5}}\right) - \omega_{R5}\left(\frac{N_{R5}}{N_{S5}-N_{R5}}\right) \quad (\text{Eq. 6})$$

$$\omega_{P4} = \omega_{C5} - \frac{N_{S4}(\omega_{S4} - \omega_{C5})}{N_{P4}} \quad (\text{Eq. 7})$$

$$\omega_{P5b} = \omega_{C5} + \frac{N_{R5}(\omega_{R5} - \omega_{C5})}{N_{P5b}} \quad (\text{Eq. 8})$$

$$\omega_{P5a} = \omega_{C5} - \frac{N_{S5}(\omega_{S5} - \omega_{C5})}{N_{P5a}} \quad (\text{Eq. 9})$$

$$\omega_{P5a} = \omega_{C5} - \frac{N_{P5b}(\omega_{P5b} - \omega_{C5})}{N_{P5a}} \quad (\text{Eq. 10})$$

(Combine eqs. 7&8)

Since: $\omega_{P4} = \omega_{P5b}$ $$\omega_{C5} = \frac{\omega_{S4}N_{S4}N_{P5b} + \omega_{R5}N_{P4}N_{R5}}{(N_{S4}N_{P5b} + N_{P4}N_{R5})} \quad (\text{Eq. 11})$$

(Combine eqs. 6&11)

Since: $\omega_{C5} = \omega_{C5}$ $$\omega_{R5} = \frac{\omega_{S5}N_{S5}(N_{S4}N_{P5b} + N_{P4}N_{R5}) - \omega_{S4}N_{S4}N_{P5b}(N_{S5} - N_{R5})}{N_{R5}(N_{S5}N_{P4} + N_{S4}N_{P5b})} \quad (\text{Eq. 12})$$

Mode 1 carrier$_{4-5}$ grounded, $\omega_{C5} = 0$ (From eq. 3)

$$\omega_{R5} = \frac{\omega_{S5}}{e_5}$$

Mode 2 sun$_4$ grounded, $\omega_{S4} = 0$ (From eq. 12)

$$\omega_{R5} = \omega_{S5}\frac{N_{S5}(N_{S4}N_{P5b} + N_{P4}N_{R5})}{N_{R5}(N_{S5}N_{P4} + N_{S4}N_{P5b})} = \omega_{S5}\frac{(N_{S4}N_{P5b} + N_{P4}N_{R5})}{e_5(N_{S5}N_{P4} + N_{S4}N_{P5b})}$$

Mode 3 sun$_4$ locked to carrier$_{4-5}$, $\omega_{S4} = \omega_{C5}$ (From eq. 11) Locked planetary $$\omega_{C5} = \omega_{S4} = \omega_{R5} = \omega_{R4}$$

(From eq. 3) Locked planetary $$\omega_{C5} = \omega_{R5} = \omega_{S5}$$

Figure 3A:
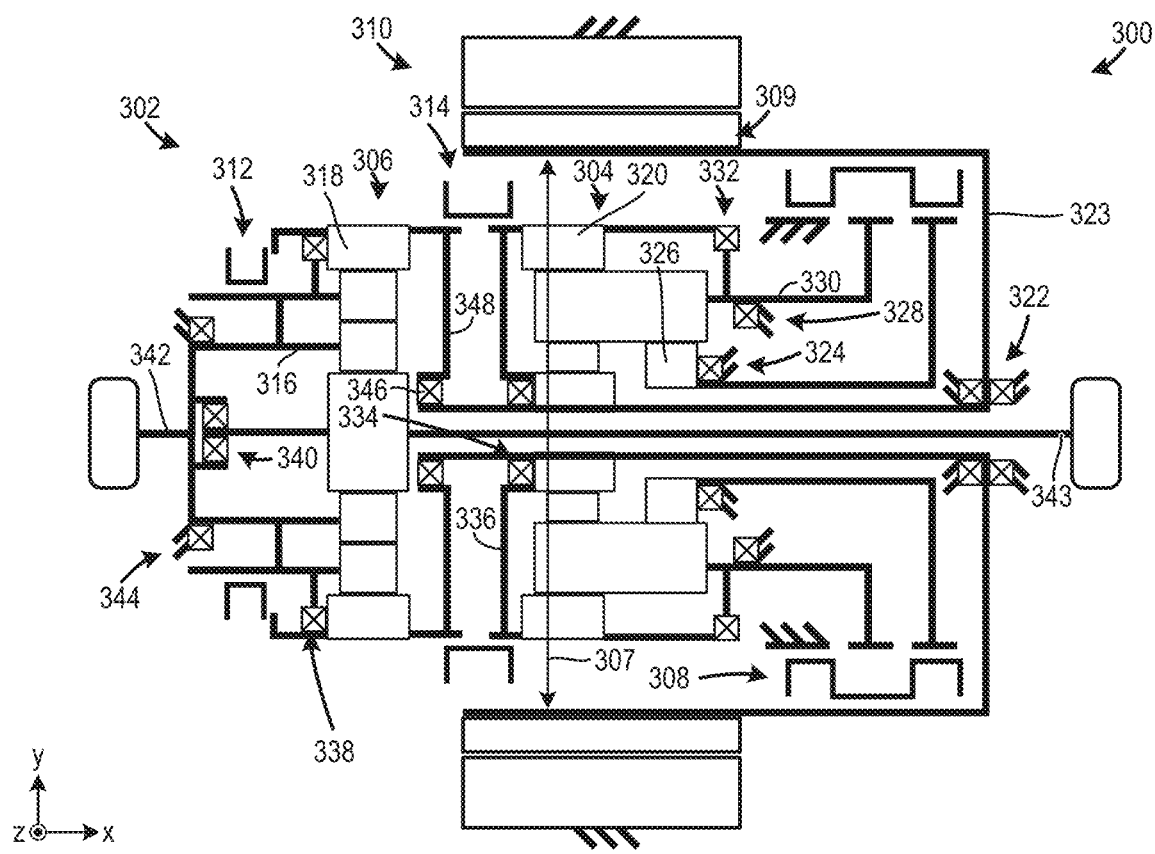
FIGS. 3A-3E show different examples of electric machine and input gear train architectures for the electric axle depicted in FIGS. 1A-1B.

FIG. 3A shows an electric axle 300 with a transmission 302 that includes a Ravigneaux mode planetary gear set 304 and a differential meshed planet compound planetary gear set 306. The architectures of the Ravigneaux mode planetary gear set 304 and the differential meshed planet compound planetary gear set 306 are similar to the mode planetary gear set 104 and the differential meshed planet compound planetary gear set 105, shown in FIG. 1A. The transmission 302 again includes a mode clutch 308 that allows the transmission to achieve three-speed functionality, similar to the transmission 102, shown in FIG. 1A.

FIG. 3A specifically depicts an electric machine 310 in the electric axle 300. As described herein the electric machines associated with the electric axles may be traction motors (e.g., motor-generators). The electric machine 310 depicted in FIG. 3A is specifically arranged concentric to the differential meshed planet compound planetary gear set 306 and the Ravigneaux mode planetary gear set 304. To elaborate, an inner diameter 307 of a rotor 309 of the electric machine 310 is shown circumferentially surrounding at least a portion the transmission and specifically the Ravigneaux mode planetary gear set 304. However, as discussed in greater detail herein, the electric machine may have a variety of suitable positions and orientations. At least a portion of the meshed planet compound planetary gear sets are positioned in an interior opening of the electric machine, in the illustrated example.

FIG. 3A also depicts a differential locking clutch 312 and an axle disconnect clutch 314. The differential locking clutch 312 is configured to rotationally couple a carrier 316 and a ring gear 318 in the differential meshed planet compound planetary gear set 306. In this way, the differential is able to be selectively locked to increase axle performance, particularly in low-traction operating environments (e.g., four wheel drive applications). The differential locking clutch 312 allows the output shafts 342 and 343 (e.g., axle shafts) of the differential meshed planet compound planetary gear set 306 to be selectively locked for rotation with one another. Further, the axle disconnect clutch 314 is configured to selectively decouple the ring gear 318 in the differential meshed planet compound planetary gear set 306 and a ring gear 320 in the Ravigneaux mode planetary gear set 304. The axle disconnect clutch 314 allows the differential meshed planet compound planetary gear set 306 to be selectively decoupled from the Ravigneaux mode planetary gear set 304. One or both of the differential locking clutch 312 and the axle disconnect clutch 314 may be incorporated into any of the transmissions described herein. The axle disconnect clutch 314 allows vehicle driveline efficiency to be increased for towing, transporting a series of decked vehicles, or if one electric axle in a tandem axle configuration is being used as a tag axle.

Bearings 322 may be coupled to an input shaft 323 of the transmission 302. The input shaft 323 connects the Ravigneaux mode planetary gear set 304 and the electric machine 310. As described herein a bearing may include an inner race, roller elements (e.g., cylindrical rollers, spherical balls, tapered cylindrical rollers, needle rollers, bushings, and the like), and an outer race. A bearing 324 is coupled to a sun gear 326 in the Ravigneaux mode planetary gear set 304, in the illustrated example. Further, a bearing 328 is coupled to a carrier 330 in the Ravigneaux mode planetary gear set. Another bearing 332 is coupled to the carrier 330 and the ring gear 320, in the illustrated example. Further, in the illustrated example, bearings 334 and 346 are coupled to shafts 336 and 348 respectively and/or other suitable mechanical structures which are connected to the ring gears 318 and 320. A bearing 338 may be coupled to the ring gear 318 and the carrier 316, a bearing 340 may be coupled to the output shaft 343 and the carrier 316, and a bearing 344 may be coupled to a carrier 316. The bearings in the transmission may have another suitable arrangement in alternate embodiments.

FIGS. 3B-3E depict different electric machine and gear train arrangements for the input of the Ravigneaux mode planetary gear set 304 in different electric axle architectures. The architecture of the Ravigneaux mode planetary gear set 304, the differential meshed planet compound planetary gear set 306, the mode clutch 308, the differential locking clutch 312, and the axle disconnect clutch 314 in the transmission 302 are similar to the component architecture and layout shown in FIG. 3A. Therefore, redundant description is omitted for concision. Further, it will be understood that the electric machine and input gear train arrangements may be applied to electric axles where the Ravigneaux gear set includes a stepped planet arrangement such as the electric transmission layout depicted in FIG. 2A. Therefore, redundant description of the overlapping components is omitted for brevity.

Figure 3B:
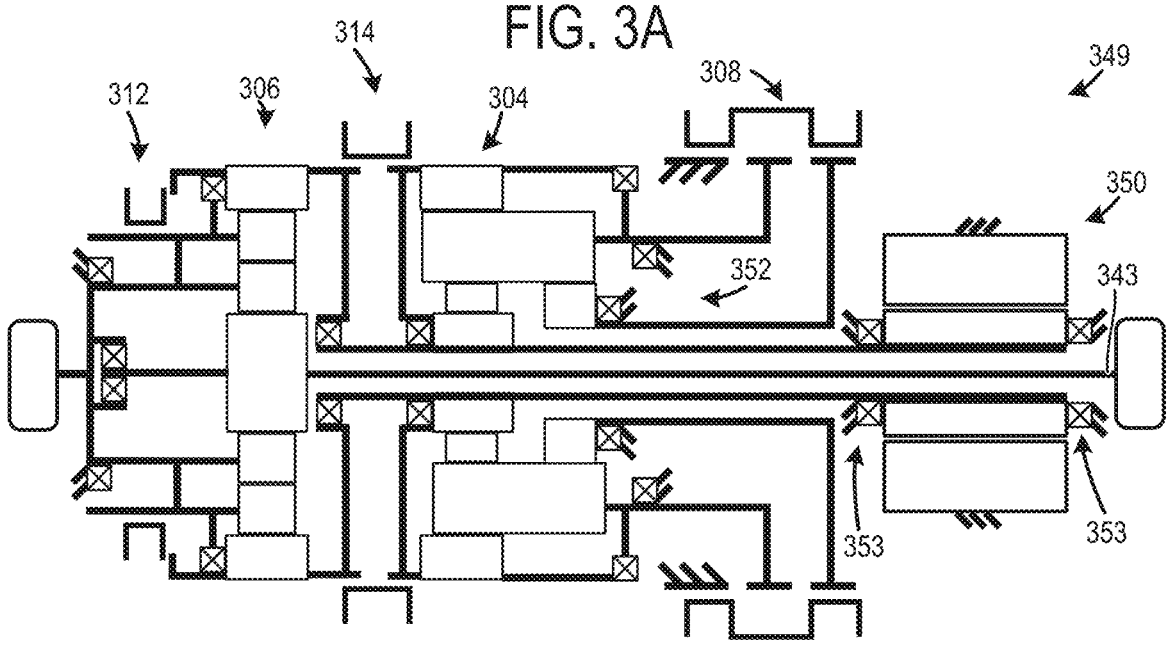

FIG. 3B specifically shows an electric axle 349 with an electric machine 350 that is positioned concentric to the output shaft 343 and positioned on an outboard axial side 352 of the Ravigneaux mode planetary gear set 304. A portion of the output shaft 343 extends through an opening in the electric machine 350, in the illustrated example. In this way, the electric axle's space efficiency is increased. FIG. 3B further shows bearings 353 that are coupled to the electric machine 350. The electric axle includes additional bearings with a layout that is similar to FIG. 3A. For instance, generally, rotating shafts and gears have bearings coupled thereto. The other electric axles shown in FIGS. 3C-3E also include a similar bearing layout in the Ravigneaux mode planetary gear set 304, the differential meshed planet compound planetary gear set 306, the axle disconnect clutch 314, and the differential locking clutch 312. However, other bearing layouts are possible and at least one of the differential locking clutch 312 and the axle disconnect clutch 314 may be omitted from any of the electric axle architectures shown in FIGS. 3A-3E. As indicated above, the axle disconnect clutch 314 and the differential locking clutch 312 may be dog clutches, synchronizers, friction clutches (e.g., wet friction clutches), radial clutches, face clutches, curvic clutches, magnetic clutches, combinations thereof, and the like. Further, the axle disconnect clutch 314 and the differential locking clutch 312 may be actuated via electromechanic actuators, pneumatic actuators, hydraulic actuators, electro-magnetic actuators, barrel cam actuators, combinations thereof, and the like. Shift forks, such as translational or rotational shift forks, may specifically be used to actuate at least a portion of the clutches described herein, as previously indicated.

Figure 3C:
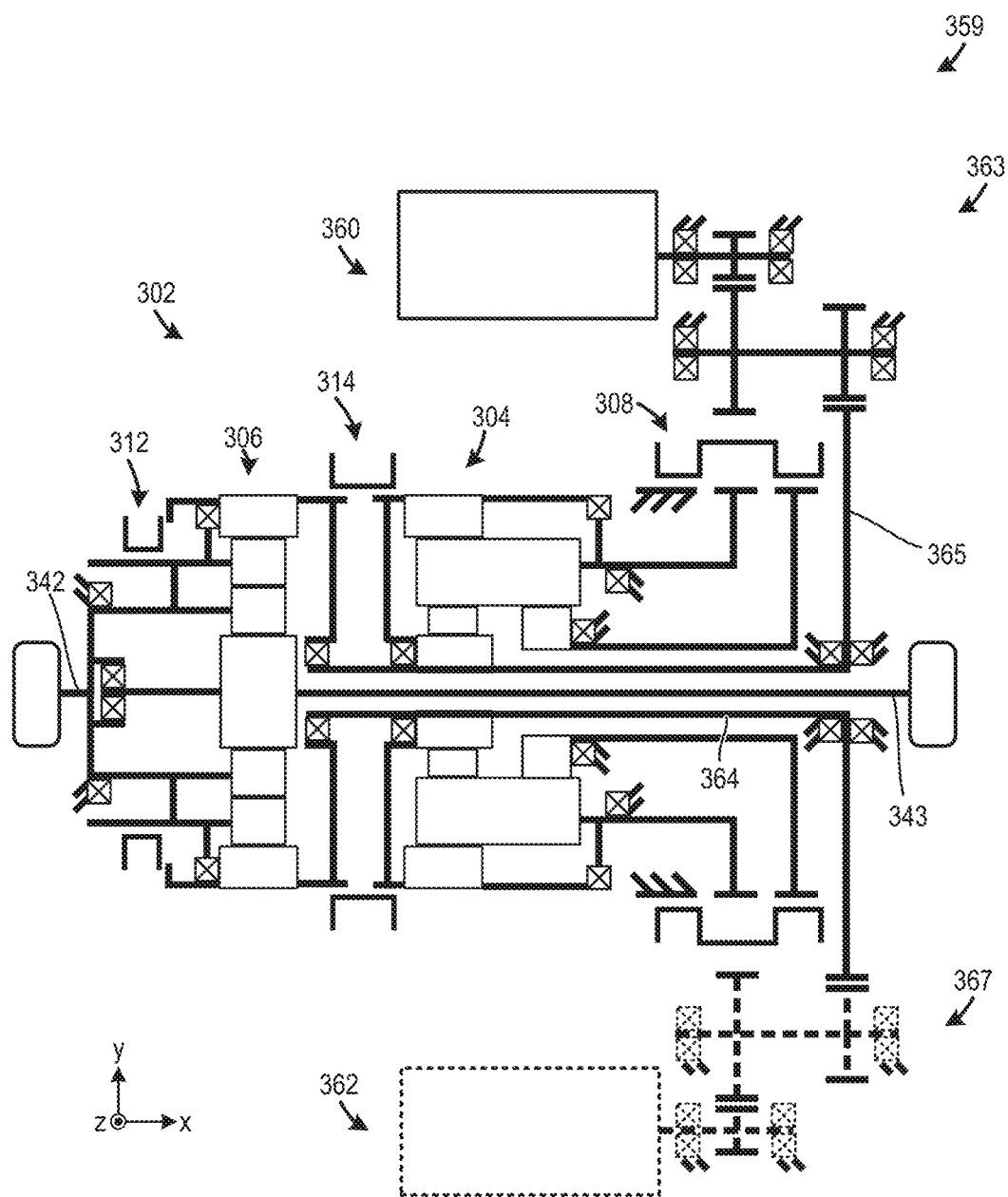

FIG. 3C shows an electric axle 359 with two electric machines 360 and 362 which are each arranged parallel to one of the output shafts 342 and 343 and mechanically attached to the input of the transmission 302 using gear trains 363 and 367. A gear 365 meshes with gears in each of the gear trains 363 and 367 and provides a mechanical connection between a shaft 364 which is rotationally coupled to the input of the Ravigneaux mode planetary gear set 304. It will be appreciated that the electric machine 362 and corresponding gear train 367 are optional and therefore may be omitted from the electric axle in alternate embodiments. More generally, a variety of gear train layouts that are connected to the input of the Ravigneaux mode planetary gear set may be used. For instance, the gear trains used to connect the first electric machine and/or the second electric machine may include additional gear passes. In alternate examples, one or more planetary gear sets (e.g., simple planetary gear sets, compound planetary gear sets, and the like) may be used to connect the one or more electric machine(s) to the Ravigneaux mode planetary gear set. For instance, a planetary gear set which is coaxial to the electric machine may be used to connect the electric machine to the Ravigneaux mode planetary gear set. Additionally or alternatively, a planetary gear set which is positioned coaxial to the rotational axis of the output shaft 343 may be used to rotationally couple the electric machine to the Ravigneaux mode planetary gear set. In any of the embodiments where one or more planetary gear sets provide the input connection for the Ravigneaux mode planetary gear set, a carrier in the planetary gear set may be grounded, a ring gear in the planetary gear set may be grounded, or a sun gear in the planetary gear set may be grounded, in different examples. Additional gear passes, chains, belts, combinations thereof, and the like may additionally or alternatively be used to transfer mechanical power between the one or more electric machines to the Ravigneaux mode planetary gear set.

Further, it will be understood, that any of the electric axles described herein may include a second electric machine, if desired. For instance, the second electric machine may be coupled to the input of the Ravigneaux mode planetary gear set in an identical manner to the mechanical connection formed between the first electric machine and the input of the Ravigneaux mode planetary gear set, in one example. In another example the second electric machine may be coupled to the input of the Ravigneaux mode planetary gear set using a different gearing arrangement to allow a different electric machine to mode planetary gear set input ratio, which may allow the second electric machine to have different characteristics than the first electric machine. Additionally, a disconnect clutch may be arranged between the second electric machine and the Ravigneaux mode planetary gear set to decouple the second electric machine from the Ravigneaux mode planetary gear set to further increase efficiency, in some instances.

Figure 3D:
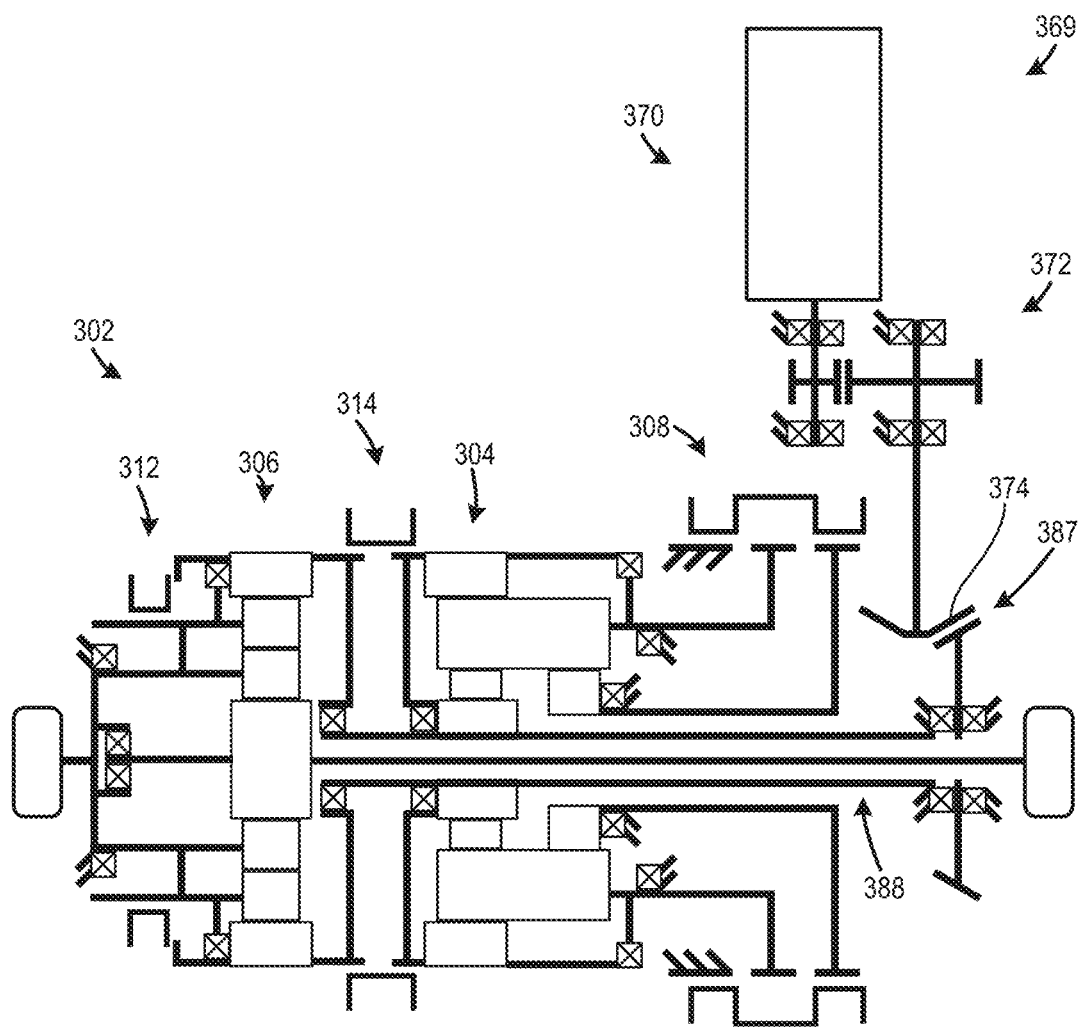

FIG. 3D shows an electric axle 369 with electric machine 370 that is arranged perpendicular to the rotational axis of the transmission 302. A gear train 372 which includes bevel gears 374 provides input to the Ravigneaux mode planetary gear set 304. Similar to the exemplary electric axle 359 depicted in FIG. 3C, the addition of a second electric machine, and a second electric machine disconnect clutch has been considered. Further, bevel gears 387 are provided in the gear train 372 to connect the gear train to the input shaft 388.

Figure 3E:
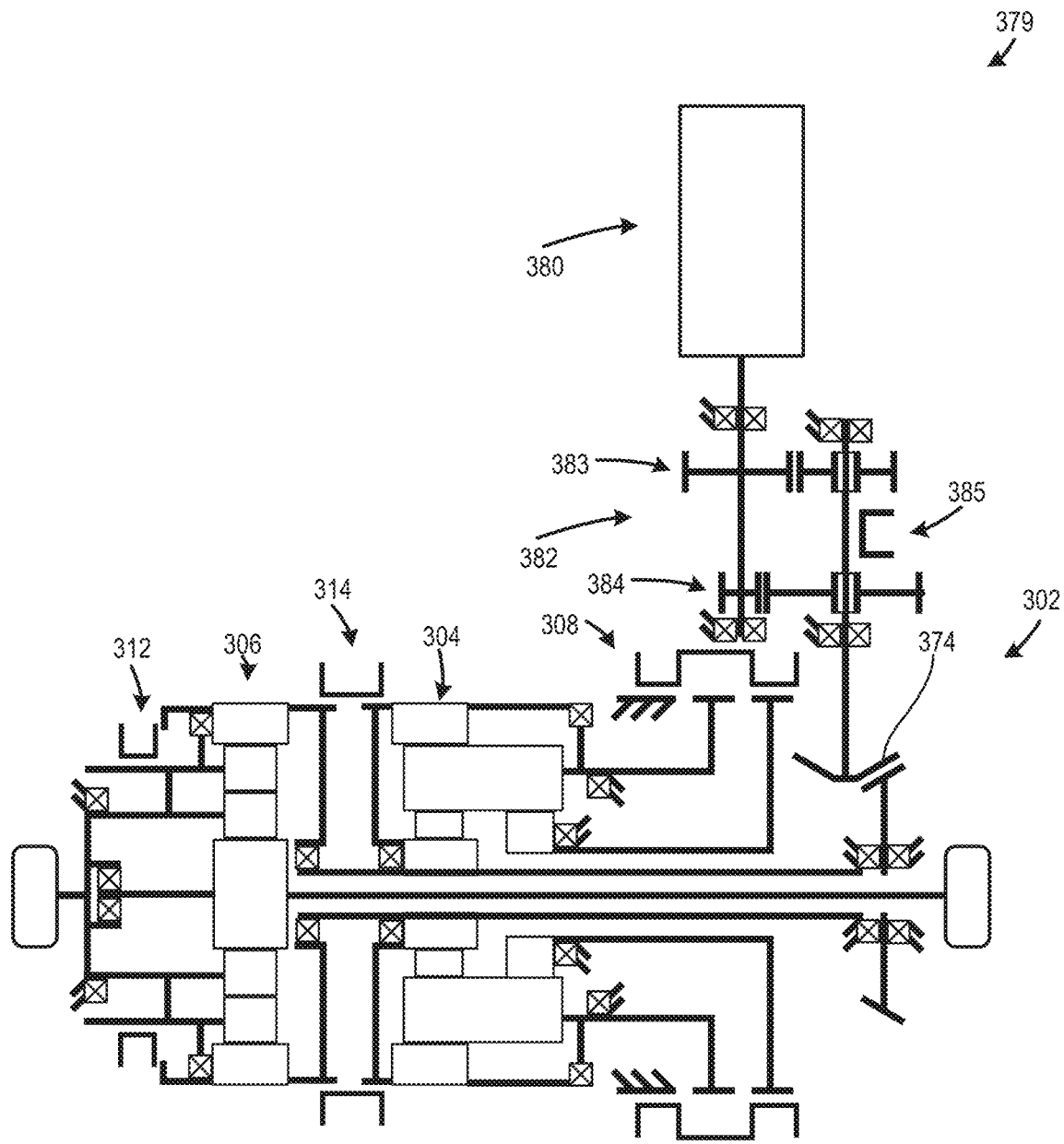

FIG. 3E shows an electric axle 379 with electric machine 380 arranged perpendicular to the rotational axis of the transmission 302. In the illustrated example, the electric axle includes an input gear train 382 with multiple gear reductions 383 and 384 which are selectable via a clutch 385. In this way, the selectable gearing in the transmission may be further expanded which may allow the electric machine to be more efficiently operated. Similar to exemplary electric axle 359 depicted in FIG. 3C, the addition of a second electric machine, and a second electric machine disconnect clutch has been considered. However, as noted above, a variety of gear train layouts which provide input to the Ravigneaux mode planetary gear set have been contemplated.

It will be appreciated that electric axles which include combined input gear train and/or motor arrangement features from two or more of FIGS. 3A-3E have been envisioned. Further, any of the different motor and/or input gear train arrangements may be used with any of the transmission architectures or combinations of the transmission architecture described herein.

Figure 4:
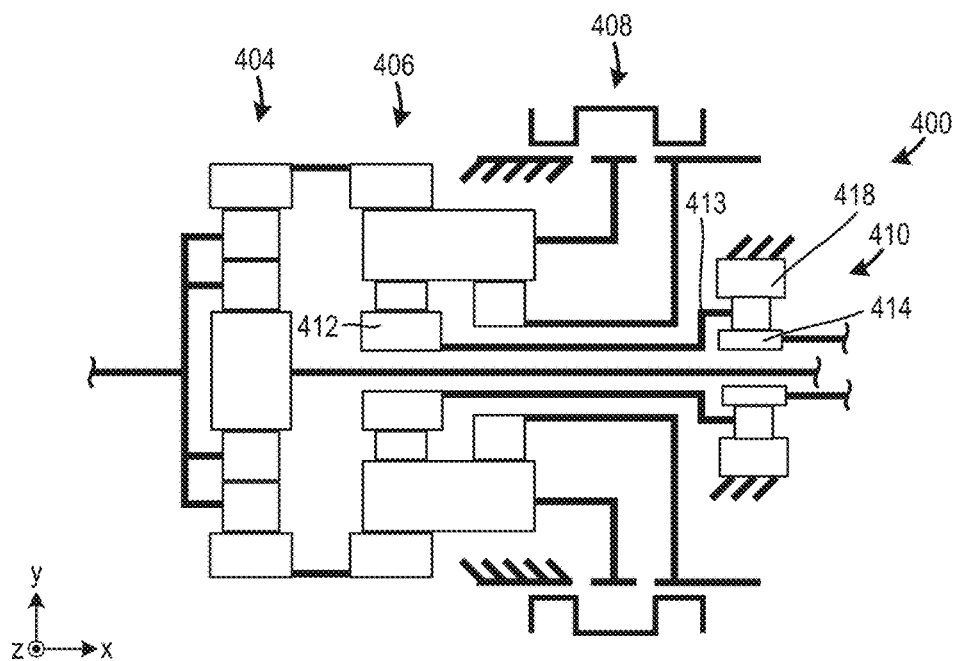
FIGS. 4-7 show different examples of a transmission for an electric axle with a differential meshed planet compound planetary gear set and a Ravigneaux gear set rotationally coupled to another planetary gear set in different configurations.

FIG. 4 shows another example of a transmission 400 for an electric axle. The transmission 400, in the illustrated example, again includes a differential meshed planet compound planetary gear set 404, a Ravigneaux mode planetary gear set 406, and a mode clutch 408. The arrangement of the differential meshed planet compound planetary gear set 404 and the Ravigneaux mode planetary gear set 406 are identical to the differential meshed planet compound planetary gear set 105 and the mode planetary gear set 104, shown in FIG. 1A. Therefore, redundant description of the overlapping components is omitted for brevity.

Further, as shown in FIG. 4, a simple planetary gear set 410 is directly coupled to a sun gear 412 in the Ravigneaux mode planetary gear set 406 via a carrier 413. Further, a sun gear 414 of the simple planetary gear set functions as the input of the transmission. Further, a ring gear 418 in the simple planetary gear set is grounded in the example illustrated FIG. 4. However, alternate simple planetary gear set configurations are possible. For example, in the simple planetary gear set 410, the ring gear 418 may be coupled to the sun gear 412 in the Ravigneaux mode planetary gear set 406, and in the simple planetary gear set 410 the carrier 413 may be grounded, and the sun gear 414 of the simple planetary gear set 410 may function as the input of the transmission.

Figure 5:
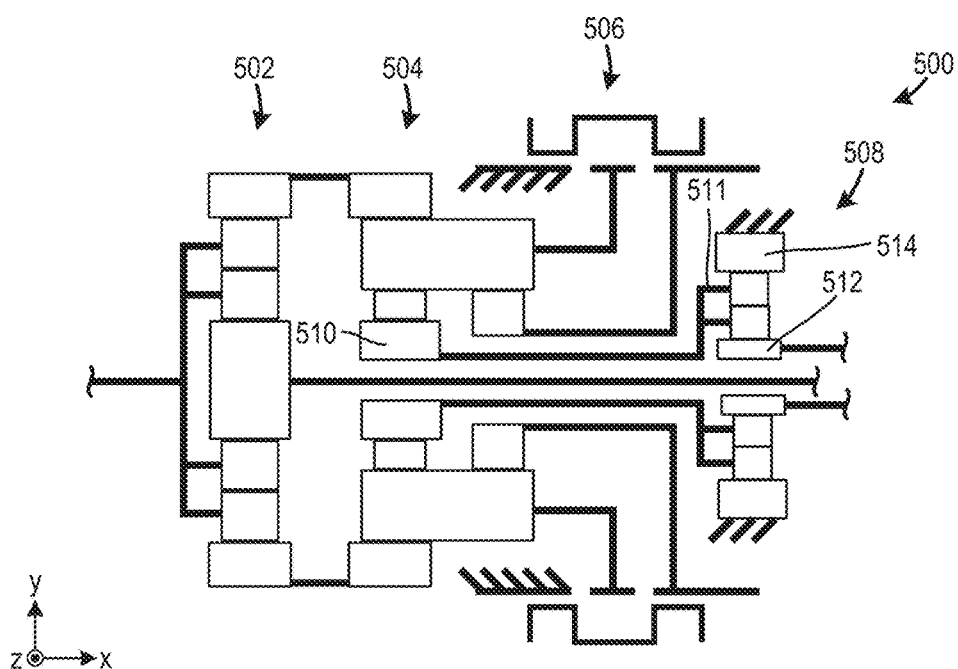

FIG. 5 shows another example of a transmission 500 for an electric axle. The transmission 500, in the illustrated example, includes a differential meshed planet compound planetary gear set 502, a Ravigneaux mode planetary gear set 504, and a mode clutch 506, similar to the transmission 102 shown in FIG. 1A. Further, as illustrated in FIG. 5, a meshed planet compound planetary gear set 508 is directly coupled to a sun gear 510 in the Ravigneaux mode planetary gear set 504 via a carrier 511. A sun gear 512 of the meshed planet compound planetary gear set 508 functions as the input of the transmission 500. Further, a ring gear 514 in the meshed planet compound planetary gear set 508 is grounded in FIG. 5. However, alternate meshed planet compound planetary gear set configurations are possible. For example, in the meshed planet compound planetary gear set 508, the ring gear 514 may be coupled to the sun gear 510 in the Ravigneaux mode planetary gear set 504, and in the meshed planet compound planetary gear set 508 the carrier 511 may be grounded, and the sun gear 512 of the meshed planet compound planetary gear set 508 may function as the input of the transmission.

Figure 6:
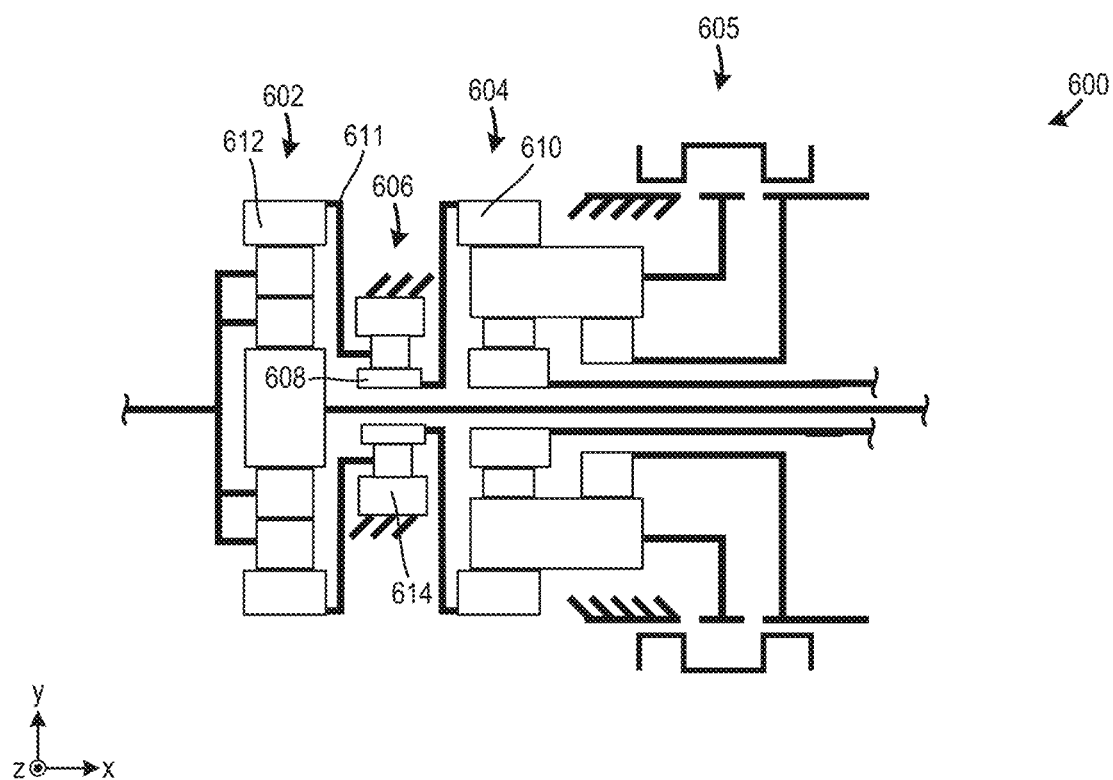

FIG. 6 shows another example of a transmission 600 for an electric axle. The transmission 600, in the illustrated example, again includes a differential meshed planet compound planetary gear set 602 and a Ravigneaux mode planetary gear set 604 with a mode clutch 605. However, in the illustrated example, a simple planetary gear set 606 is positioned between the differential meshed planet compound planetary gear set 602 and the Ravigneaux mode planetary gear set 604. To expound, in the illustrated example, a sun gear 608 in the simple planetary gear set 606 is rotationally coupled to a ring gear 610 in the Ravigneaux mode planetary gear set 604, a carrier 611 in the simple planetary gear set 606 is rotationally coupled to a ring gear 612 in the differential meshed planet compound planetary gear set 602, and a ring gear 614 in the simple planetary gear set 606 is grounded. However, other planetary gear set configurations are possible. For example, in the simple planetary gear set 606, the ring gear 614 may be coupled to the ring gear 612 in the differential meshed planet compound planetary gear set 602, and in the simple planetary gear set 606, the carrier 611 may be grounded, and the sun gear 608 in the simple planetary gear set 606 may be rotationally coupled to a ring gear 610 in the Ravigneaux mode planetary gear set 604.

Figure 7:
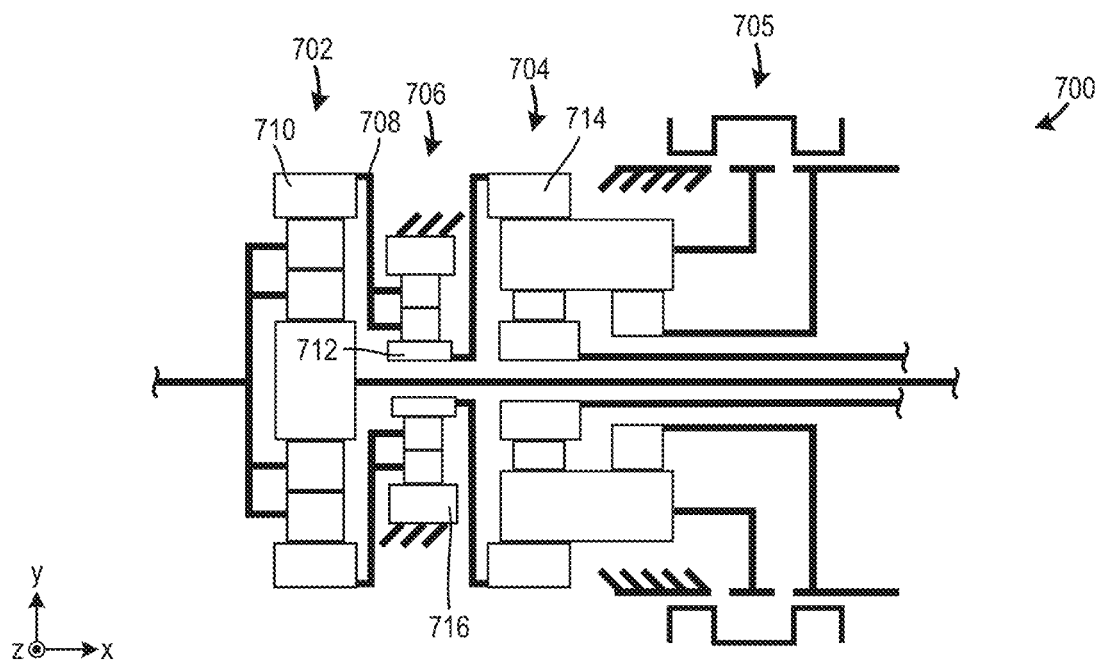

FIG. 7 shows another example of a transmission 700 for an electric axle. The transmission 700, in the illustrated example, again includes a differential meshed planet compound planetary gear set 702 and a Ravigneaux mode planetary gear set 704 with a mode clutch 705. The transmission further includes another meshed planet compound planetary gear set 706 with a carrier 708 rotationally coupled to a ring gear 710 in the differential meshed planet compound planetary gear set 702. The meshed planet compound planetary gear set 706 further includes a sun gear 712 rotationally coupled to a ring gear 714 in the Ravigneaux mode planetary gear set 704. Additionally, in the illustrated example, a ring gear 716 in the meshed planet compound planetary gear set 706 is grounded. However, other planetary gear set configurations are possible, as previously indicated. For example, in the meshed planet compound planetary gear set 706, the ring gear 716 may be coupled to the ring gear 710 in the differential meshed planet compound planetary gear set 702, and in the meshed planet compound planetary gear set 706, the carrier 708 may be grounded, and the sun gear 712 in the meshed planet compound planetary gear set 706 may be rotationally coupled to a ring gear 714 in the Ravigneaux mode planetary gear set 704. It will be appreciated that the transmissions shown in FIGS. 4-7 as well as the other transmissions described herein may include axle disconnect clutches and/or differential locking clutches.

Figure 8:
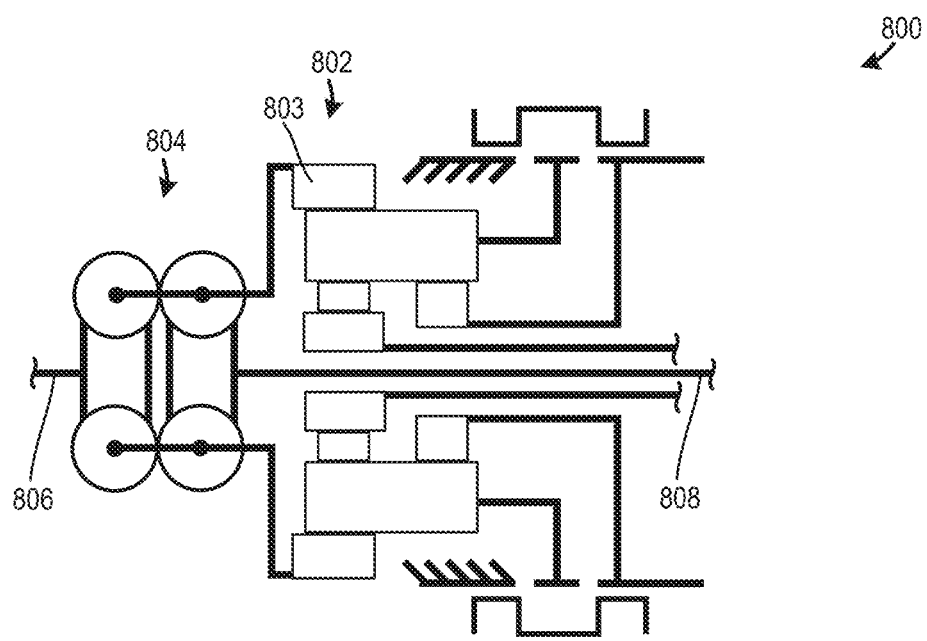
FIG. 8 shows another example of an electric axle with a Ravigneaux gear set and a limited slip differential.

FIG. 8 shows another example of a transmission 800 for an electric axle. The transmission 800, in the illustrated example, contains a Ravigneaux mode planetary gear set 802. However, in the illustrated example, a ring gear 803 in the Ravigneaux mode planetary gear set 802 is rotationally coupled to a limited slip differential 804 that is configured to constrain the speed differentiation between the output shafts 806 and 808 using a clutch, friction, bias ratios, and/or other suitable devices and methods.

Figure 9:
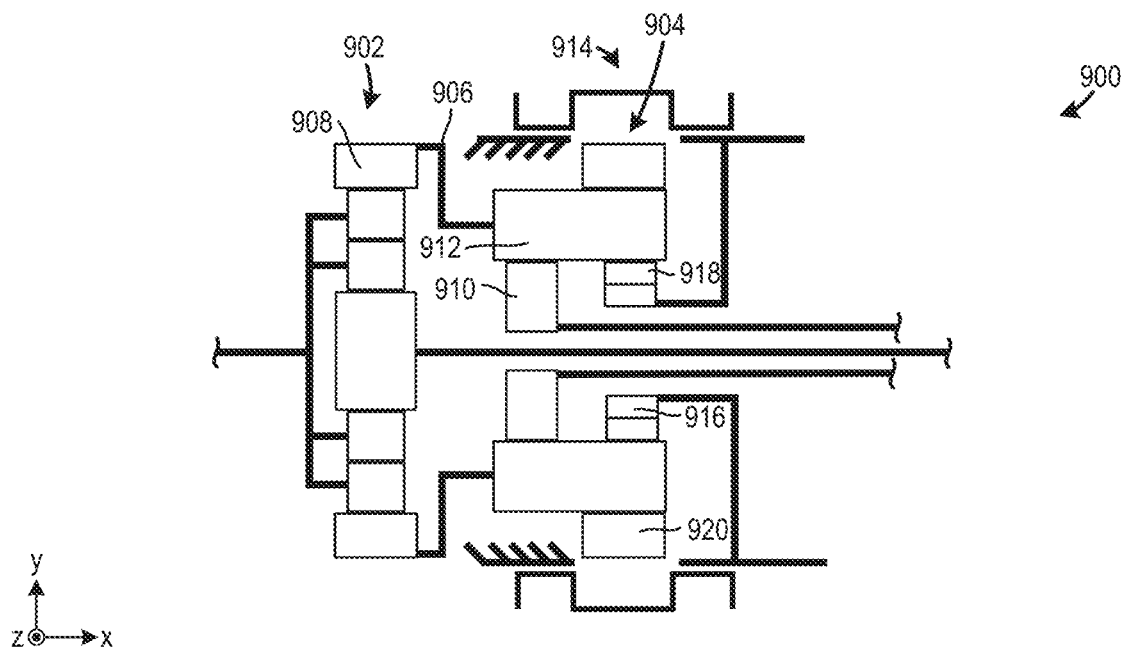
FIG. 9 shows another example of an electric transmission with a multi-speed Ravigneaux gear set and a differential meshed planet compound planetary gear set.

FIG. 9 shows another example of a transmission 900 for an electric axle. The transmission 900, in the illustrated example, again includes a differential meshed planet compound planetary gear set 902. The transmission 900 also includes a Ravigneaux mode planetary gear set 904 with a different architecture than the previously described Ravigneaux mode planetary gear sets. To expound, the Ravigneaux mode planetary gear set 904 includes a carrier 906 that is rotationally coupled to a ring gear 908 of the differential meshed planet compound planetary gear set 902. Further, a sun gear 910 in the Ravigneaux mode planetary gear set 904 which meshes with a set of planet gears 912 functions as the input of the Ravigneaux mode planetary gear set 904. Further, a mode clutch 914 is configured to ground the ring gear 920 which meshes with planet gears 912 in a first mode, ground the sun gear 916 which meshes with planet gears 918 in a second mode, and rotationally couple the ring gear 920 and the sun gear 916 in a third mode. The set of planet gears 918 mesh with the set of planet gears 912, in the illustrated example. The set of planet gears 918 and the set of planet gears 912 are rotatably mounted to the carrier 906. In this way, the input and output of the Ravigneaux mode planetary gear set may be varied. However, other planetary gear set configurations are possible, including arrangements were the planet gears 912 includes a stepped planet assembly.

Figure 10:
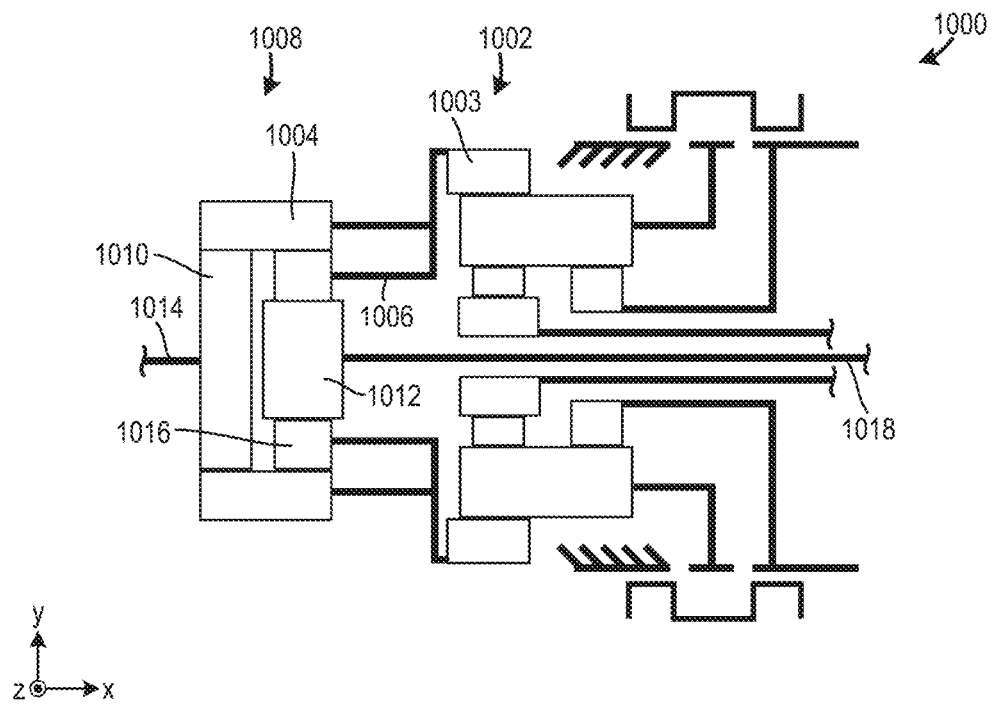
FIG. 10 shows another example of an electric axle with a Ravigneaux gear set and a dual sun gear differential.

FIG. 10 shows another example of a transmission 1000 for an electric axle. The transmission 1000, in the illustrated example, again includes a Ravigneaux mode planetary gear set 1002. However, in the illustrated example, a ring gear 1003 in the Ravigneaux mode planetary gear set 1002 is rotationally coupled to a carrier 1006 in a dual sun differential 1008. The dual sun differential 1008 further includes a first sun gear 1010 and a second sun gear 1012 that are coupled to output shafts 1014 and 1018, respectively. Planet gears 1004 are meshed with planet gears 1016 and sun gear 1010, and planet gears 1016 mesh with sun gear 1012. Planet gears 1004 and 1016 are rotatably mounted to the carrier 1006, in the illustrated example. The dual sun differential may be an open differential or may be a limited slip differential that is configured to constrain the speed differentiation between the output shafts 1014 and 1018 using a clutch, friction, bias ratios and/or other suitable device and methods. It will be understood, that the Ravigneaux mode planetary gear sets described herein may be coupled to other types of differentials such as locking differentials, open differentials, and the like.

Figure 11:
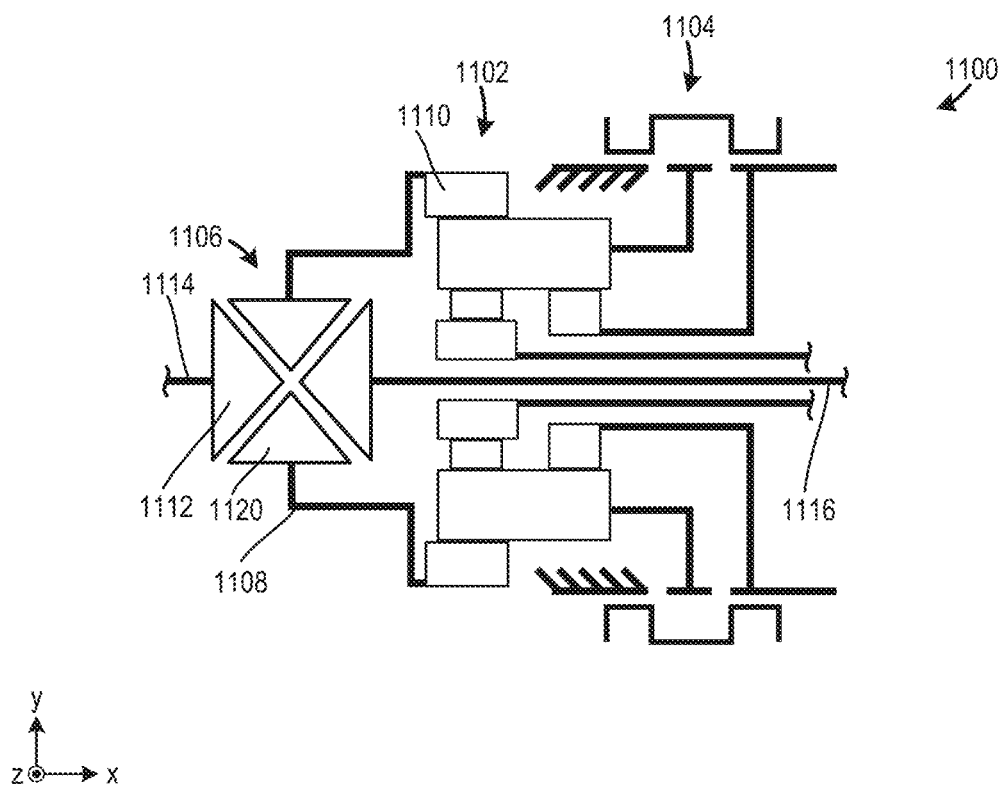
FIG. 11 shows another example of an electric axle with a Ravigneaux gear set and an open differential.

FIG. 11 shows another example of a transmission 1100 for an electric axle. The transmission 1100 again includes a Ravigneaux mode planetary gear set 1102 with a mode clutch 1104. The transmission 1100 further includes an open differential 1106 with a differential carrier 1108 that is driven by a ring gear 1110 in the Ravigneaux mode planetary gear set 1102. The differential 1106 further includes differential pinions 1120 (which may be referred to as spider gears) which are rotatably mounted to the differential carrier 1108 and are in mesh with side gears 1112 (which may be referred to as sun gears). The side gears 1112 are rotationally coupled to output shafts 1114 and 1116. Further, it will be understood that the differential 1106 (shown in FIG. 11) as well as the differentials shown in FIGS. 8 and 10 are examples of dual sun gear differentials.

Furthermore, it will be appreciated that the differentials described in FIGS. 1A-11 may further be combined with springs, clutches or cones, cam ramps, helical gears, worm gears, spur gears, viscous couplings, gerotors, and electronic components to create a limited slip differential (LSD) (e.g., a torque sensing limited slip differential), an automatic torque biasing (ATB) limited slip differential, a clutch pack style limited slip differential, a bevel gear differential, a dual sun differential, a reduction differential, and the like.

The output shafts in the electric axles described herein may be directly coupled to drive wheels, wheel end gear reductions (e.g., planetary gear reductions in the wheel hubs), or other suitable mechanical components in applications that demand a differential output in vehicles (e.g., cars, trucks, boats, ATVs, commercial vehicles, light vehicles, off-highway vehicles, mining vehicles, rail vehicles, and the like) as well as other applications (e.g., manufacturing applications such as manufacturing machinery, industrial applications such as industrial machinery, and the like). When the electric axles describe herein are used in vehicles, it will be appreciated that the transmissions may be used as trans-axles in electric vehicles (EVs) such as all-electric vehicles (e.g., battery electric vehicles (BEVs)) and hybrid electric vehicles. As such, the vehicles that utilize the transmissions described herein may have an internal combustion engine (e.g., a spark ignition engine, a compression ignition engine, combinations thereof, and the like), in some examples. Further, the electric axles described herein may have axle disconnect and/or differential locking functionality.

Gearing in the planetary gear sets described herein may have spur or helical profiles. As described above, the second motors in the electric axles described herein are optional. Further, in one example, the gearing used to mechanically couple the motors to the transmission input may be identical and engage a final gear on the output centerline. In another example, the gearing associated with the second motor may be different from the gearing associated with the first motor and engage the final gear on the output centerline. Further, in one example, the gearing associated with the second motor may include a clutch to decouple the second electric machine from the mode planetary gear set to further increase efficiency, in some instances.

Still further, in one example, the gearing associated with the second motor may engage the gearing associated with the first motor prior to the final gear on the output centerline. Even further in one example, the gearing associated with the second motor may have a different ratio and engage the gearing associated with the first motor prior to the final gear on the output centerline.

Further, the three speed planetary gear sets shown in FIGS. 1A-11 may have 1:1 ratio in one of the modes, in one use-case example. However, the electric axle may have a variety of ratios which may be selected based on the end-use design goals of the vehicle platform. As such, the ratios illustrated in the FIGS. 1A-11 are use-case ratios and different ratios may be used in the electric axles.

Further, the exact location and number of the bearings in the electric axle architectures illustrated in the FIGS. 3A-3E is suggestive and exemplary in nature and it will be understood that alternate bearing layouts, types, quantities, etc. may be used, in alternate examples.

Further, it will be understood that the electric axles may utilize one or more transverse motors which may be coupled to the transmission's input via hypoid gears or other suitable spiral or bevel gears. In such an example, the motor may be engaged to the hypoid gear with a mating pinion, and between the motor and pinion there may be other gear passes and/or shiftable gears. Shiftable gears may be positioned on either parallel mating shaft, in different examples. Further, additional gear passes may be added to the electric axles, if desired. Still further, the planetary gear sets described herein may take the form of simple planetary gear sets, meshed planet compound planetary gear sets, stepped planet compound planetary gear sets, and/or magnetic planetary gear sets.

Further, it will be appreciated that the various motor arrangements illustrated in FIGS. 3A-3E may be used in any of the electric axles described herein such as any of the electric axles shown in FIGS. 1A, 2A, and 4-11 or combinations of said electric axles. Further, different combinations of the motor architectures and the transmission architectures that include multiple features from separate embodiments have been envisioned.

The invention will be further described in the following paragraphs. In one aspect, an electric axle system is provided that comprises: an electric machine; a multi-speed transmission rotationally coupled to the electric machine, rotationally coupled to two output shafts, and including: a Ravigneaux gear set rotationally coupled and positioned coaxial to a differential; and a mode clutch configured to selectively: ground a carrier or a ring gear in the Ravigneaux gear set; ground a sun gear in the Ravigneaux gear set; and rotationally couple the carrier or the ring gear to the sun gear in the Ravigneaux gear set. In one example, the differential may be a differential meshed planet compound planetary gear set. In another example, a ring gear in the Ravigneaux gear set may be rotationally coupled to a ring gear in the differential meshed planet compound planetary gear set. In one example, the electric axle system may further comprise a differential locking clutch configured to selectively rotationally couple a ring gear in the differential to a carrier in the differential to lock rotation of the two output shafts. In another example, the electric axle system may further comprise an axle disconnect clutch configured to selectively disconnect the Ravigneaux gear set from the differential. Further, in one example, the differential may be a dual sun gear planetary gear set. In yet another example, the electric machine may be positioned coaxial, parallel, or transverse, to the Ravigneaux gear set and the differential. In yet another example, the electric axle system may further comprise a second electric machine rotationally coupled to the multi-speed transmission. In another example, the Ravigneaux gear set and the differential are at least partially positioned within an inner diameter of a rotor of the electric machine. In another example, the electric axle may further comprise a third planetary gear set rotationally coupled to an input of the Ravigneaux gear set or rotationally coupled to an input of the differential and an output of the Ravigneaux gear set.

In another aspect, a method for operation of an electric axle system is provided that comprises operating a mode clutch to: in a first mode, ground a carrier or a ring gear in a Ravigneaux gear set; in a second mode, ground a sun gear in the Ravigneaux gear set; and in a third mode, rotationally couple the carrier or the ring gear to the sun gear in the Ravigneaux gear set; wherein the electric axle system includes: an electric machine; a multi-speed transmission rotationally coupled to the electric machine, rotationally coupled to two output shafts, and including: the Ravigneaux gear set rotationally coupled and positioned coaxial to a differential; and the mode clutch. In one example, the differential may be a meshed planet compound planetary gear set; a ring gear in the Ravigneaux gear set may be rotationally coupled to a ring gear in the differential meshed planet compound planetary gear set; and a sun gear and a carrier in the differential meshed planet compound planetary gear set may be rotationally coupled to separate output shafts. In one example, the method may further comprise operating a differential locking clutch to rotationally couple a ring gear in the differential to a carrier in the differential to lock rotation of the two output shafts. In yet another example, the method may further comprise operating an axle disconnect clutch to selectively disconnect the Ravigneaux gear set from the differential.

In another aspect, an electric axle system is provided that comprises an electric machine; a multi-speed transmission rotationally coupled to the electric machine and including: a Ravigneaux gear set rotationally coupled and positioned coaxial to a differential meshed planet compound planetary gear set; and a mode clutch configured to shift the Ravigneaux gear set between three modes; wherein the differential meshed planet compound planetary gear set is rotationally coupled to two output shafts. In one example, the mode clutch may be configured to: in a first mode, ground a carrier or a ring gear in the Ravigneaux gear set; in a second mode, ground a sun gear in the Ravigneaux gear set; and in a third mode, rotationally couple the carrier or the ring gear to the sun gear in the Ravigneaux gear set. In one example, the electric axle system may further comprise a differential locking clutch configured to selectively rotationally couple a ring gear in the differential meshed planet compound planetary gear set to a carrier in the differential meshed planet compound planetary gear set to lock rotation of the two output shafts; and an axle disconnect clutch configured to selectively disconnect the Ravigneaux gear set from the differential meshed planet compound planetary gear set. In one example, in the system, a ring gear in the Ravigneaux gear set may be rotationally coupled to a ring gear in the differential meshed planet compound planetary gear set; and a sun gear in the differential meshed planet compound planetary gear set may be rotationally coupled to a first axle shaft; and the carrier in the differential meshed planet compound planetary gear set may be rotationally coupled to a second axle shaft. Further, in one example, the electric axle system may further comprise a second meshed planet compound planetary gear set rotationally coupled to the Ravigneaux gear set and the differential meshed planet compound planetary gear set. In yet another example, a ring gear in the differential meshed planet compound planetary gear set may be rotationally coupled to a carrier or a ring gear in the Ravigneaux gear set.

FIGS. 1A-11 show example configurations with relative positioning of the various components. If shown directly contacting each other, or directly coupled, then such elements may be referred to as directly contacting or directly coupled, respectively, at least in one example. Similarly, elements shown contiguous or adjacent to one another may be contiguous or adjacent to each other, respectively, at least in one example. As an example, components laying in face-sharing contact with each other may be referred to as in face-sharing contact. As another example, elements positioned apart from each other with only a space therebetween and no other components may be referred to as such, in at least one example. As yet another example, elements shown above/below one another, at opposite sides to one another, or to the left/right of one another may be referred to as such, relative to one another. Further, as shown in the figures, a topmost element or point of element may be referred to as a "top" of the component and a bottommost element or point of the element may be referred to as a "bottom" of the component, in at least one example. As used herein, top/bottom, upper/lower, above/below, may be relative to a vertical axis of the figures and used to describe positioning of elements of the figures relative to one another. As such, elements shown above other elements are positioned vertically above the other elements, in one example. As yet another example, shapes of the elements depicted within the figures may be referred to as having those shapes (e.g., such as being circular, straight, planar, curved, rounded, chamfered, angled, or the like). Additionally, elements co-axial with one another may be referred to as such, in one example. Further, elements shown intersecting one another may be referred to as intersecting elements or intersecting one another, in at least one example. Further still, an element shown within another element or shown outside of another element may be referred as such, in one example. In other examples, elements offset from one another may be referred to as such.

Motor and shift control logic/programs, inverters, electronic control units (ECUs), memory storage, throttle, brake, speed, and inclination sensors and the like, shift actuators, etc. may further be used in any of the electric axles and transmissions described herein.

FIGS. 1A-11 provide for a method for electric axle operation wherein the transmission shifts between two of the three modes based on vehicle operating conditions. The method may further selectively lock the differential via operation of a differential locking clutch in the differential. The method may even further include, selectively disconnecting the axle via operation of an axle disconnect clutch.

Further, the axles and transmissions described herein may include control systems that include a controller with a processor and memory that stores instructions for carrying out the method steps described herein. To elaborate, the control methods and routines disclosed herein may be stored as executable instructions in non-transitory memory and may be carried out by a system including the controller in combination with the various sensors and actuators. Further, portions of the methods may be physical actions taken in the real world to change a state of a device. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the examples described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the system, where the described actions are carried out by executing the instructions in a system including the various hardware components in combination with the electronic controller. One or more of the method steps described herein may be omitted if desired.

While various embodiments have been described above, it should be understood that they have been presented by way of example, and not limitation nor restriction. It will be appreciated that the configurations and routines disclosed herein are exemplary in nature, and that these specific examples are not to be considered in a limiting sense, because numerous variations are possible. For example, the above technology can be applied to powertrains that include different types of propulsion sources including different types of electric machines, internal combustion engines, and/or transmissions. The technology may be used as a stand-alone, or used in combination with other power transmission systems not limited to machinery and propulsion systems for tandem axles, electric tag axles, P4 axles, EVs (e.g., HEVs, BEVs, etc.), agriculture vehicles or machines, marine vehicles or machines, motorcycles, recreational vehicles, and on and off highway vehicles, mining vehicles, rail vehicles, manufacturing machinery, industrial machinery, and the like, as an example. The subject matter of the present disclosure includes all novel and non-obvious combinations and sub-combinations of the various systems and configurations, and other features, functions, and/or properties disclosed herein. It will be apparent to persons skilled in the relevant arts that the disclosed subject matter may be embodied in other specific forms without departing from the spirit of the subject matter.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. An electric axle system, comprising:
an electric machine;
a multi-speed transmission rotationally coupled to the electric machine, rotationally coupled to two output shafts, and including:

a Ravigneaux gear set rotationally coupled and positioned coaxial to a differential; and a mode clutch configured to selectively:
grind a carrier in the Ravigneaux gear set;
ground a sun gear in the Ravigneaux gear set; and
rotationally couple the carrier to the sun gear in the Ravigneaux gear set.

2. The electric axle system of claim 1, wherein the differential is a differential meshed planet compound planetary gear set that includes two sets of planet gears that mesh with one another.

3. The electric axle system of claim 2, wherein a ring gear in the Ravigneaux gear set is rotationally coupled to a ring gear in the differential and a second sun gear in the Ravigneaux gear set is rotationally coupled to an upstream component that receives mechanical power from the electric machine.

4. The electric axle system of claim 1, further comprising a differential locking clutch configured to selectively rotationally couple a ring gear in the differential to a carrier in the differential to lock rotation of the two output shafts.

5. The electric axle system of claim 1, further comprising an axle disconnect clutch configured to selectively disconnect the Ravigneaux gear set from the differential.

6. The electric axle system of claim 1, wherein the differential is a dual sun gear planetary gear set.

7. The electric axle system of claim 1, wherein the electric machine is positioned coaxial, parallel, or transverse, to the Ravigneaux gear set and the differential.

8. The electric axle system of claim 1, further comprising a second electric machine rotationally coupled to the multi-speed transmission.

9. The electric axle system of claim 1, wherein the Ravigneaux gear set and the differential are at least partially positioned within an inner diameter of a rotor of the electric machine.

10. The electric axle system of claim 1, further comprising a third planetary gear set rotationally coupled to an input of the Ravigneaux gear set or rotationally coupled to an input of the differential and an output of the Ravigneaux gear set.

11. A method for operation of an electric axle system, comprising:
operating a mode clutch to:
in a first mode, ground a carrier in a Ravigneaux gear set;
in a second mode, ground a sun gear in the Ravigneaux gear set; and
in a third mode, rotationally couple the carrier to the sun gear in the Ravigneaux gear set;
wherein the electric axle system includes:
an electric machine;
a multi-speed transmission rotationally coupled to the electric machine, rotationally coupled to two output shafts, and including:
the Ravigneaux gear set rotationally coupled and positioned coaxial to a differential; and
the mode clutch;
wherein the Ravigneaux gear set and the differential are at least partially positioned within an inner diameter of a rotor of the electric machine.

12. The method of claim 11, wherein:
the differential is a differential meshed planet compound planetary gear set;
a ring gear in the Ravigneaux gear set is rotationally coupled to a ring gear in the differential meshed planet compound planetary gear set; and
a sun gear and a carrier in the differential meshed planet compound planetary gear set are each separately rotationally coupled to a respective one of the two output shafts.

13. The method of claim 11, further comprising operating a differential locking clutch to rotationally couple a ring gear in the differential to a carrier in the differential to lock rotation of the two output shafts.

14. The method of claim 11, further comprising operating an axle disconnect clutch to selectively disconnect the Ravigneaux gear set from the differential.

15. An electric axle system, comprising:
an electric machine; and
a multi-speed transmission rotationally coupled to the electric machine and including:
a Ravigneaux gear set rotationally coupled and positioned coaxial to a differential meshed planet compound planetary gear set;
a mode clutch configured to shift the Ravigneaux gear set between three modes;
a differential locking clutch configured to selectively rotationally couple a ring gear in the differential meshed planet compound planetary gear set to a carrier in the differential meshed planet compound planetary gear set to lock rotation of two output shafts;
an axle disconnect clutch configured to selectively disconnect the Ravigneaux gear set from the differential meshed planet compound planetary gear set; and
a second meshed planet compound planetary gear set rotationally coupled to the Ravigneaux gear set and the differential meshed planet compound planetary gear set;
wherein the differential meshed planet compound planetary gear set is rotationally coupled to the two output shafts.

16. The electric axle system of claim 15, wherein the mode clutch is configured to:
in a first mode, ground a carrier or a ring gear in the Ravigneaux gear set;
in a second mode, ground a sun gear in the Ravigneaux gear set; and
in a third mode, rotationally couple the carrier or the ring gear to the sun gear in the Ravigneaux gear set.

17. The electric axle system of claim 15, wherein:
a ring gear in the Ravigneaux gear set is rotationally coupled to the ring gear in the differential meshed planet compound planetary gear set; and
a sun gear in the differential meshed planet compound planetary gear set is rotationally coupled to a first output shaft of the two output shafts; and
the carrier in the differential meshed planet compound planetary gear set is rotationally coupled to a second output shaft of the two output shafts.

18. The electric axle system of claim 15, wherein the ring gear in the differential meshed planet compound planetary gear set is rotationally coupled to a carrier or a ring gear in the Ravigneaux gear set.

* * * * *